(12) United States Patent
Watanabe et al.

(10) Patent No.: US 9,219,863 B2
(45) Date of Patent: Dec. 22, 2015

(54) IMAGE CAPTURE APPARATUS

(71) Applicant: Canon Kabushiki Kaisha, Tokyo (JP)

(72) Inventors: Takeshi Watanabe, Tokyo (JP); Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/053,162

(22) Filed: Oct. 14, 2013

(65) Prior Publication Data

US 2014/0111661 A1    Apr. 24, 2014

(30) Foreign Application Priority Data

Oct. 22, 2012  (JP) ................................ 2012-233302

(51) Int. Cl.
*H04N 5/228* (2006.01)
*H04N 5/232* (2006.01)
*G06T 5/00* (2006.01)

(52) U.S. Cl.
CPC ............ *H04N 5/23267* (2013.01); *G06T 5/003* (2013.01); *H04N 5/23258* (2013.01); *H04N 5/23287* (2013.01); *G06T 2207/20201* (2013.01)

(58) Field of Classification Search
CPC ......... H04N 5/228; H04N 5/232; H04N 7/12; H04N 5/23267; H04N 5/23258; H04N 5/23287; G06K 9/40; G06T 5/003
USPC ........ 348/208.6, 208.4, 208.1, 208.3, 208.99, 348/208.11, 208.12, 208.13, 222.1, 345, 348/208.2, 208.5, 204.2; 382/261, 263, 382/264, 255; 375/240.16, 240.22
See application file for complete search history.

(56) References Cited

U.S. PATENT DOCUMENTS

| | | | | |
|---|---|---|---|---|
| 5,959,666 A | * | 9/1999 | Naganuma | 348/208.3 |
| 6,781,622 B1 | * | 8/2004 | Sato et al. | 348/208.4 |
| 7,292,270 B2 | * | 11/2007 | Higurashi et al. | 348/208.3 |
| 7,554,578 B2 | * | 6/2009 | Molgaard | 348/231.3 |

(Continued)

FOREIGN PATENT DOCUMENTS

JP    2011-029735 A    2/2011

OTHER PUBLICATIONS

This application is related U.S. Appl. No. 14/053,103 and 14/053,055.

(Continued)

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image capture apparatus comprises a shake detection unit configured to detect a shake, a translational motion correction amount calculation unit configured to calculate a first correction amount for correcting a translational motion component, a perspective component correction amount calculation unit configured to calculate a second correction amount for correcting a perspective component, an image stabilization unit configured to correct the image blurring of the captured image based on the first and second correction amount, and a control unit configured to restrict, if a panning state of the image capture apparatus is determined, the translational motion correction amount calculation unit and the perspective component correction amount calculation unit so as to decrease correction capability for the translational motion component and the perspective component.

24 Claims, 21 Drawing Sheets

(56) References Cited

U.S. PATENT DOCUMENTS

| | | | |
|---|---|---|---|
| 8,049,783 B2* | 11/2011 | Hatanaka | 348/208.6 |
| 8,279,290 B2* | 10/2012 | Yamanaka | 348/208.5 |
| 8,284,262 B2* | 10/2012 | Tanaka | 348/208.2 |
| 8,514,290 B2 | 8/2013 | Takeuchi | |
| 2005/0140793 A1* | 6/2005 | Kojima et al. | 348/208.99 |
| 2008/0085108 A1* | 4/2008 | Sekino et al. | 396/55 |
| 2009/0128700 A1* | 5/2009 | Oshino et al. | 348/208.6 |
| 2010/0020244 A1 | 1/2010 | Mitsuya et al. | |
| 2011/0019016 A1* | 1/2011 | Saito et al. | 348/208.6 |
| 2011/0157396 A1* | 6/2011 | Kotani | 348/222.1 |
| 2011/0299792 A1* | 12/2011 | Sakaguchi et al. | 382/107 |
| 2013/0162847 A1* | 6/2013 | Miyazawa | 348/208.1 |
| 2014/0111658 A1* | 4/2014 | Watanabe et al. | 348/208.1 |

OTHER PUBLICATIONS

Notice of Allowance dated Nov. 28, 2014, issued in a related U.S. Appl. No. 14/053,055.

This application is related U.S. Appl. No. 14/053,103 and 14/053,055. both filed and received on Oct. 14, 2013.

* cited by examiner

F I G. 20A
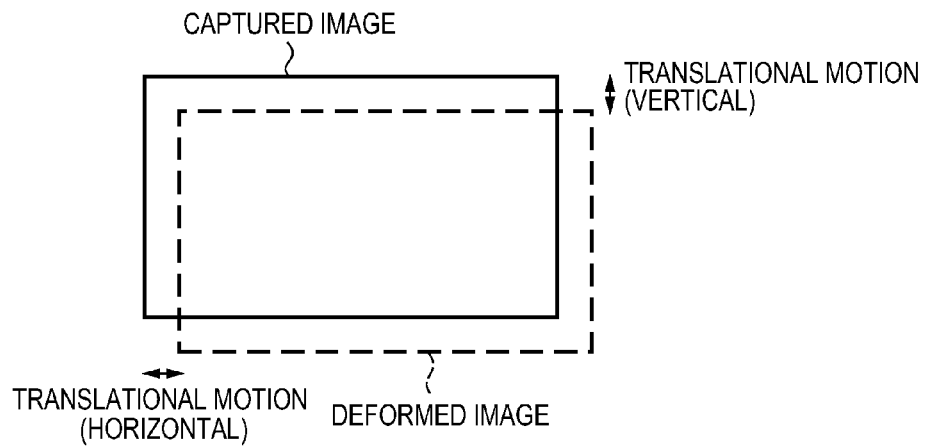
F I G. 20B
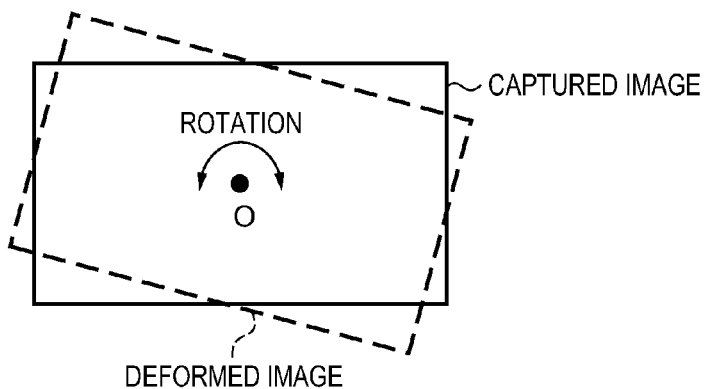
F I G. 20C
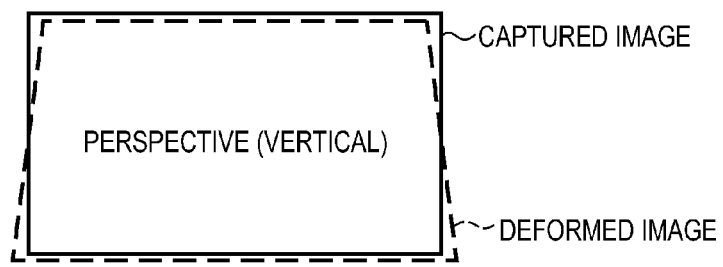

IMAGE CAPTURE APPARATUS

BACKGROUND OF THE INVENTION

1. Field of the Invention

The present invention relates to a technique of, in an image capture apparatus, correcting blur of a captured image caused by a shake of the image capture apparatus, using a method of deforming an image.

2. Description of the Related Art

In recent years, along with development of a technique of correcting a shake of an image capture apparatus, an image stabilization function of correcting not only blurring of a captured image caused by a camera shake when a user is in a still state but also blurring of a captured image which is generated in shooting while the user is walking has become widespread. When the user shoots an image while walking, in addition to blurring of the captured image in the horizontal and vertical directions, the following blur is generated in the captured image. For example, blur includes rotation of the captured image caused by rotation of the image capture apparatus about the optical axis, and distortion of the captured image into a trapezoid, which is generated when the image capture apparatus tilts with respect to an object.

As a method of correcting various kinds of blur of a captured image which are generated in shooting while walking, there is known a method of calculating the image deformation amount of the captured image and deforming the image so as to cancel the image deformation amount (see Japanese Patent Laid-Open No. 2011-29735).

In the aforementioned conventional example, a deformation amount of a captured image caused by a shake acting on the image capture apparatus is decomposed into deformation components including a translation component (horizontal/vertical), a perspective component (horizontal/vertical), an enlargement/reduction component, a rotation component, and a shear component. Filtering processing and the like are then performed for each component to calculate a projective transformation matrix (homography matrix). This method, however, presents the following problems.

That is, in the aforementioned conventional example, since a correction amount is calculated for each of the deformation components, a calculation amount is very large and processing is complicated. Furthermore, if correction is performed for all the deformation components, an image range which can be finally output becomes small, resulting in degradation in image quality.

For example, FIG. 21 shows an example of image stabilization by image deformation when an image capture apparatus rotates about the optical axis. A solid-line portion in FIG. 21 indicates a captured image. To correct rotation about the optical axis, the captured image is rotated about an image center O. The rotation operation results in a dotted-line image shown in FIG. 21. In this case, if an output image has the same range as that of the captured image, the image has no data at the four corners. Therefore, the output image range is a hatched region shown in FIG. 21. Although correction of rotation about the optical axis has been exemplified in FIG. 21, it is necessary to provide, for each of the deformation components, an image region (to be referred to as extra pixels hereinafter) which cannot be output. Therefore, the image range becomes small, thereby making it difficult to maintain the quality of video having undergone image stabilization.

SUMMARY OF THE INVENTION

The present invention has been made in consideration of the above problems, and provides an image capture apparatus which can minimize degradation in quality of video and obtain a preferred image stabilization effect with a simple arrangement.

According to the first aspect of the present invention, there is provided an image capture apparatus comprising: a shake detection unit configured to detect a shake of the image capture apparatus; a translational motion correction amount calculation unit configured to calculate, based on an output of the shake detection unit, a first correction amount for correcting a translational motion component of image blurring generated in a captured image due to the shake; a perspective component correction amount calculation unit configured to calculate, based on the output of the shake detection unit, a second correction amount for correcting a perspective component of the image blurring generated in the captured image due to the shake; an image stabilization unit configured to correct the image blurring of the captured image based on the first correction amount and the second correction amount; and a control unit configured to restrict, if a panning state of the image capture apparatus is determined, the translational motion correction amount calculation unit and the perspective component correction amount calculation unit so as to decrease correction capability for the translational motion component and the perspective component.

According to the second aspect of the present invention, there is provided an image capture apparatus comprising: a shake detection unit configured to detect a shake of the image capture apparatus; a translational motion correction amount calculation unit configured to calculate, based on an output of the shake detection unit, a first correction amount for correcting a translational motion component of image blurring generated in a captured image due to the shake; a perspective component correction amount calculation unit configured to calculate, based on the output of the shake detection unit, a second correction amount for correcting a perspective component of the image blurring generated in the captured image due to the shake; an image stabilization unit configured to correct the image blurring of the captured image based on the first correction amount and the second correction amount; and a control unit configured to change correction capability for the translational motion component and the perspective component, based on at least one of the first correction amount and the second correction amount.

According to the third aspect of the present invention, there is provided an image capture apparatus comprising: a shake detection unit configured to detect a shake of the image capture apparatus; a translational motion correction amount calculation unit configured to calculate, based on an output of the shake detection unit, a first correction amount for correcting a translational motion component of image blurring generated in a captured image due to the shake; a perspective component correction amount calculation unit configured to calculate, based on the first correction amount, a second correction amount for correcting a perspective component of the image blurring; and a correction unit configured to correct the image blurring based on the first correction amount and the second correction amount.

According to the fourth aspect of the present invention, there is provided an image capture apparatus comprising: a shake detection unit configured to detect a shake of the image capture apparatus; a perspective component correction amount calculation unit configured to calculate, based on an output of the shake detection unit, a first correction amount for correcting a perspective component of the image blurring; a translational motion correction amount calculation unit configured to calculate, based on the first correction amount, a second correction amount for correcting a translational motion component of image blurring generated in a captured image due to the shake; and a correction unit configured to correct the image blurring based on the first correction amount and the second correction amount.

Further features of the present invention will become apparent from the following description of embodiments with reference to the attached drawings.

BRIEF DESCRIPTION OF THE DRAWINGS

FIGS. 20A to 20F are views for explaining the definition of "blur" according to the embodiments of the present invention.

DESCRIPTION OF THE EMBODIMENTS

Embodiments of the present invention will be described in detail below with reference to the accompanying drawings.

Figure 19A:
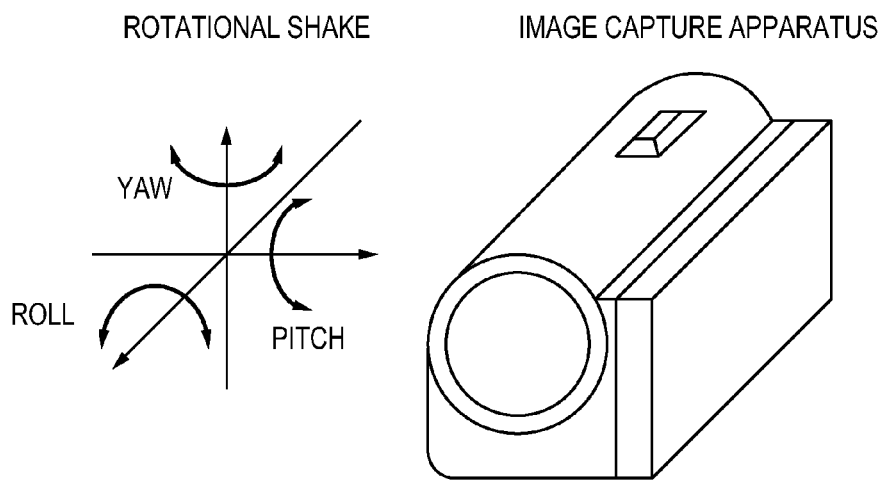
FIGS. 19A and 19B are views for explaining the definition of "shake" according to embodiments of the present invention.
Figure 19B:
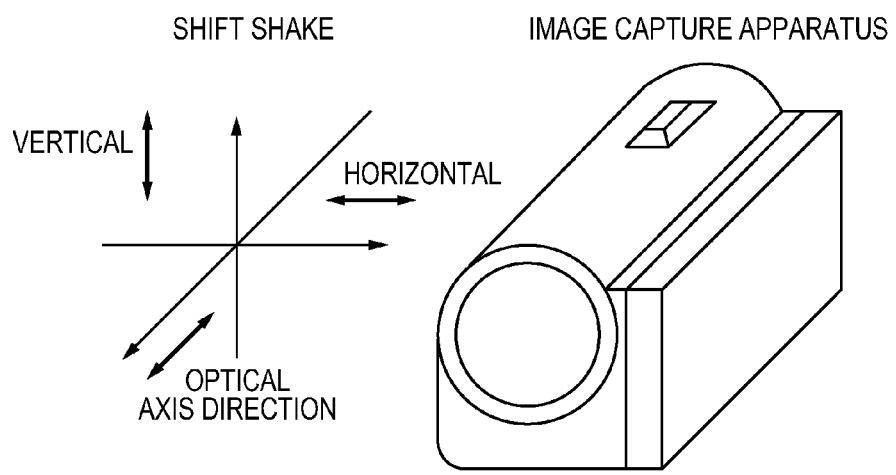
Figure 20D:
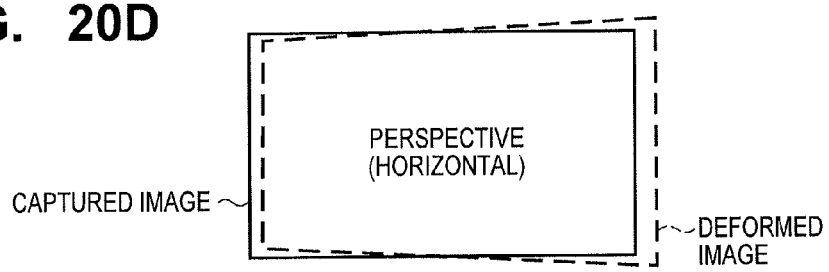
Figure 20E:
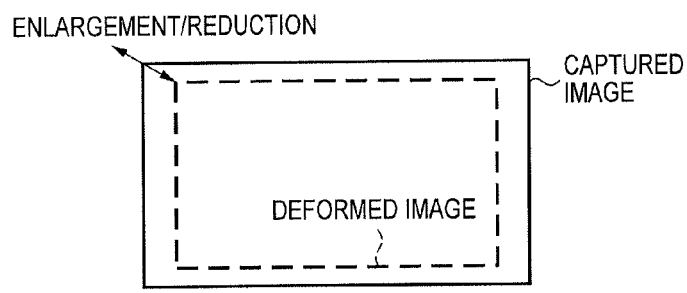
Figure 20F:
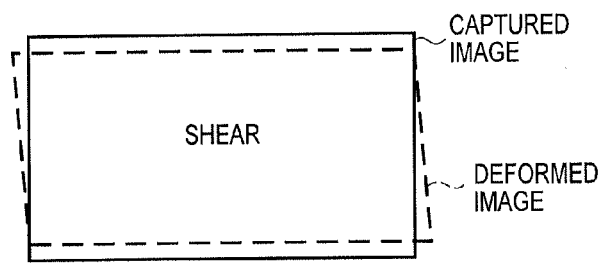
Figure 21:
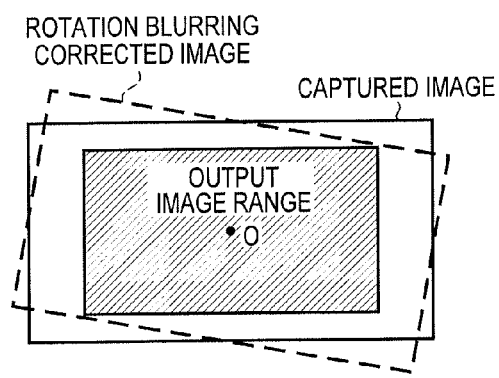
FIG. 21 is a view for explaining the problems with the conventional methods of blur correction.

The definitions of terms used in the embodiments will be explained first. In the description of the embodiments, "shake" indicates movement acting on an image capture apparatus, and "blur" indicates deformation of a captured image caused by shake acting on an image capture apparatus. In the embodiments, "shake" generically is used to refer to three "rotational shakes" in the yaw, pitch, and roll directions and three "parallel shakes" (shift shakes) in the horizontal, vertical, and optical axis directions, as shown in FIGS. 19A and 19B. On the other hand, "blur" generically indicates deformation components including a translation component (horizontal/vertical), a rotation component, a perspective component (horizontal/vertical), an enlargement/reduction component, and a shear component, as shown in FIGS. 20A to 20F.

First Embodiment

Figure 1:
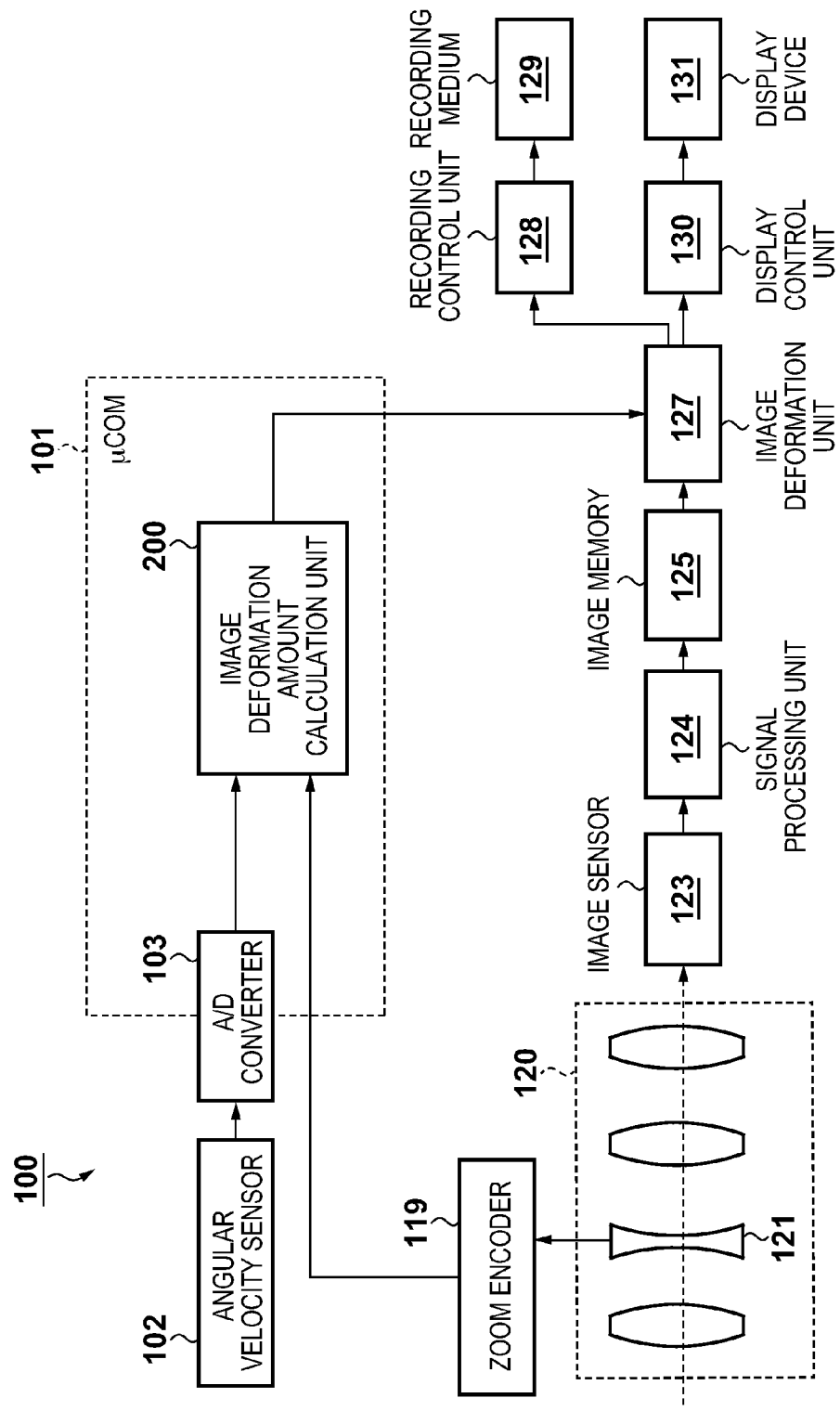
FIG. 1 is a block diagram showing an example of the arrangement of a video camera as an example of an image capture apparatus according to a first embodiment of the present invention.

FIG. 1 is a block diagram showing the arrangement of a video camera as an example of an image capture apparatus according to a first embodiment of the present invention. The components of an image capture apparatus 100 shown in FIG. 1 and examples of their operations will be described in detail below.

An angular velocity sensor 102 detects a shake acting on the image capture apparatus 100 as an angular velocity signal, and supplies the angular velocity signal to an A/D converter 103. The A/D converter 103 converts the angular velocity signal from the angular velocity sensor 102 into a digital signal, and supplies it to an image deformation amount calculation unit 200 in a μCOM (a microprocessor) 101 as angular velocity data.

An imaging optical system 120 performs an operation such as zooming or focusing, and forms an object image on an image sensor 123. A zoom encoder 119 detects the position (zoom position) of a magnification optical system 121 in the imaging optical system 120, and outputs it to the image deformation amount calculation unit 200 in the μCOM 101.

The image deformation amount calculation unit 200 calculates an image deformation amount for correcting blur of a captured image using the angular velocity data and the output of the zoom encoder 119, and sets the calculated image deformation amount in an image deformation unit 127. Processing by the image deformation amount calculation unit 200 will be described in detail later.

The image sensor 123 converts the object image formed by the imaging optical system 120 into an electrical signal that is a captured image signal, and supplies it to a signal processing unit 124. The signal processing unit 124 generates a video signal complying with, for example, the NTSC format from the signal obtained by the image sensor 123, and supplies it to an image memory 125.

The image deformation unit 127 corrects blur of the captured image by deforming the image stored in the image memory 125 based on the image deformation amount calculated by the image deformation amount calculation unit 200, and outputs the corrected image to a recording control unit 128 and a display control unit 130. The display control unit 130 outputs the video signal supplied from the image deformation unit 127 and causes a display device 131 to display the image. The display control unit 130 drives the display device 131. The display device 131 displays the image by an LCD (Liquid Crystal Display) or the like.

If an operation unit (not shown) used to instruct the start or end of recording has instructed to record the video signal, the recording control unit 128 outputs the video signal supplied from the image deformation unit 127 to a recording medium 129, and causes the recording medium 129 to record the video signal. The recording medium 129 is an information recording medium such as a semiconductor memory or a magnetic recording medium such as a hard disk.

The image deformation unit 127 performs image deformation using geometric transformation such as projective transformation. More specifically, pixel coordinates in an image before deformation (the image stored in the image memory 125) are represented by (X0, Y0) (note that the center of the captured image corresponding to the optical axis of the imaging optical system 120 is set as the origin), and pixel coordinates in an image (the output image of the image deformation unit 127) after deformation are represented by (X1, Y1). In this case, image deformation can be represented by a homogeneous coordinate system, as given by:

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad (1)$$

The left and right sides of expression (1) have the equivalence relation (even if the left or right side is multiplied by an arbitrary number, the meaning remains unchanged). If the normal equals sign is used, expression (1) can be rewritten as:

$$X1 = \frac{h1X0 + h2Y0 + h3}{h7X0 + h8Y0 + 1} \quad (2)$$

$$Y1 = \frac{h4X0 + h5Y0 + h6}{h7X0 + h8Y0 + 1} \quad (3)$$

In expression (1), the 3×3 matrix is generally called a projective transformation matrix. The image deformation amount calculation unit 200 sets elements h1 to h8 of the matrix. Note that in the following description, the image deformation unit 127 performs image deformation using projective transformation. However, any deformation method such as affine transformation may be used.

Processing performed by the image deformation amount calculation unit 200 will now be described in detail. The image deformation amount calculation unit 200 calculates the image deformation amount of the image deformation unit 127 using a shake angle of the image capture apparatus calculated from the output of the angular velocity sensor 102, and the focal length of the imaging optical system 120 calculated by the zoom encoder 119. More specifically, the projective transformation matrix in expression (1) is calculated.

A method of calculating the projective transformation matrix using the shake angle and the focal length of the imaging optical system 120 will be described below.

Figure 2A:
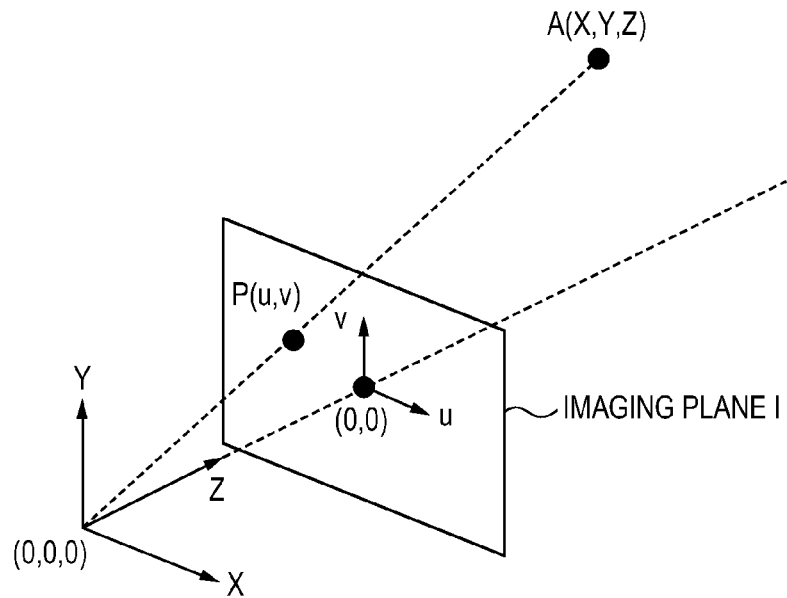
FIGS. 2A and 2B are views for explaining a pinhole camera model.

FIG. 2A shows projection of an object on an imaging plane by the image capture apparatus using a pinhole camera model. Referring to FIG. 2A, the origin (0, 0, 0) of the XYZ space coordinate system corresponds to a pinhole position in the pinhole camera model. If the imaging plane is arranged behind the pinhole position, an image projected on the imaging plane is inverted. In FIG. 2A, therefore, an imaging plane I is virtually arranged in front of the pinhole position so that the image is not inverted and is thus readily processed.

The distance in the Z direction between the imaging plane I and the origin (0, 0, 0) of the XYZ space coordinate system is a focal length f. Coordinates on the imaging plane I are defined as uv plane coordinates. Assume that the origin (0, 0) of a uv plane coordinate system coincides with (0, 0, f) in the XYZ space coordinate system. A coordinate point P(u, v) in the uv plane coordinate system represents a coordinate point obtained when an object position A(X, Y, Z) in the XYZ space coordinate system is projected on the imaging plane I. The coordinate point P is given by:

$$\begin{bmatrix} u \\ v \end{bmatrix} = \begin{bmatrix} f\frac{X}{Z} \\ f\frac{Y}{Z} \end{bmatrix} \quad (4)$$

Using a homogeneous coordinate system, equation (4) can be rewritten by:

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (5)$$

Elements in the fourth column of the 3×4 matrix in expression (5) remain 0 in the description of this embodiment, and thus expression (5) reduces to:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad (6)$$

Figure 2B:
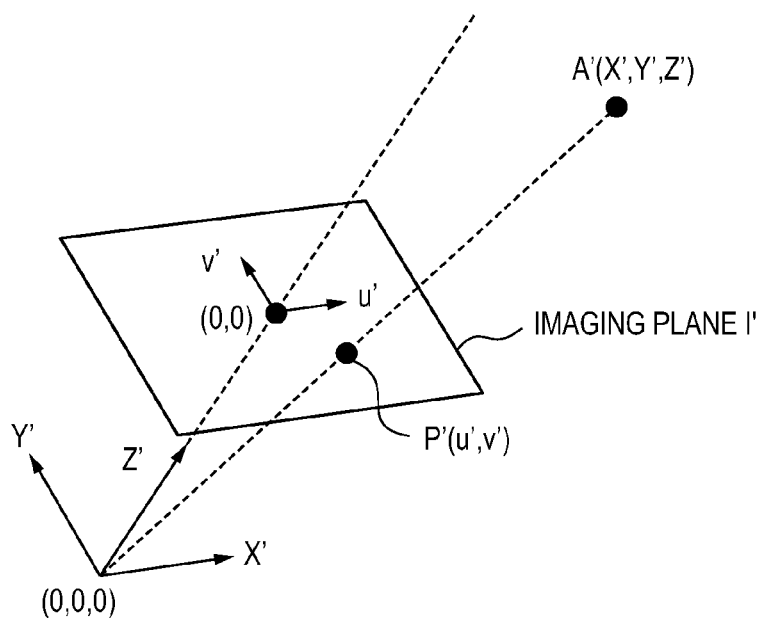

FIG. 2B shows a pinhole camera model obtained by rotating the pinhole camera model shown in FIG. 2A by R. FIG. 2B shows an X'Y'Z' space coordinate system obtained by rotating the XYZ space coordinate system shown in FIG. 2A by R. Assume that the origin (0, 0, 0) of the X'Y'Z' space coordinate system coincides with that of the XYZ space coordinate system. That is, FIG. 2B simply shows, by using a pinhole camera mode, a state in which a rotational shake R is generated but no parallel shake is generated in the image capture apparatus.

In the pinhole camera model shown in FIG. 2B, an imaging plane I' is arranged at a distance of the focal length f from the origin (0, 0, 0), as in FIG. 2A. Coordinates on the imaging plane I' are defined as u'v' plane coordinates. Assume that the origin (0, 0) of the u'v' plane coordinate system coincides with (0, 0, f) in the X'Y'Z' space coordinate system. A coordinate point P'(u', v') in a u'v' plane coordinate system represents a coordinate point obtained when an object position A'(X', Y', Z') in the X'Y'Z' space coordinate system is projected on the imaging plane I'. Note that the object A in FIG. 2A and the object A' in FIG. 2B are at the same position in the world coordinate system (that is, the object stays still). Like expression (6), using the homogeneous coordinate system, the coordinate point P' is given by:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad (7)$$

The objects A and A' are at the same position in the world coordinate system, and thus the relationship between the coordinate points of the objects A and A' is given by:

$$\begin{bmatrix} X' \\ Y' \\ Z' \end{bmatrix} = R \begin{bmatrix} X \\ Y \\ Z \end{bmatrix} \quad (8)$$

Modification of expressions (6) and (7), and substitution of them into equation (8) yields:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ v \\ 1 \end{bmatrix} \quad (9)$$

Expression (9) indicates the correspondence between the positions of the object images on the imaging planes before and after the pinhole camera is rotated by R. That is, expression (9) represents the movement of the position of a pixel on the imaging plane when a shake of rotation by R acts on the image capture apparatus. Therefore, to correct blur, it is only necessary to perform conversion to cancel the pixel movement amount when a shake acts on the image capture apparatus. That is, it is only necessary to perform conversion to return, to the original position, a pixel position which has moved when a shake of rotation by R acts on the image capture apparatus, given by:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u' \\ v' \\ 1 \end{bmatrix} \quad (10)$$

Let R be a shake acting on the image capture apparatus 100 shown in FIG. 1, f be the focal length of the imaging optical system 120, and H be the projective transformation matrix for correction of blur. Then, H is given by:

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad (11)$$

Of rotational shake amounts acting on the image capture apparatus, a rotational shake amount in the yaw direction is represented by $\theta_y$, a rotational shake amount in the pitch direction is represented by $\theta_p$, and a rotational shake amount in the roll direction is represented by $\theta_r$. In this case, R is given by:

$$R = \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_p & -\sin\theta_p \\ 0 & \sin\theta_p & \cos\theta_p \end{bmatrix} \begin{bmatrix} \cos\theta_r & -\sin\theta_r & 0 \\ \sin\theta_r & \cos\theta_r & 0 \\ 0 & 0 & 1 \end{bmatrix} \quad (12)$$

H of equation (11) can be decomposed into deformation components including a translation component $\vec{t}$, enlargement/reduction component s (constant), rotation component r (matrix), shear component k (matrix), perspective component $\vec{v}$, using $$H = \begin{bmatrix} sr & \vec{t} \\ \vec{0}^t & 1 \end{bmatrix} \begin{bmatrix} k & \vec{0} \\ \vec{0}^t & 1 \end{bmatrix} \begin{bmatrix} I & \vec{0} \\ \vec{v}^t & 1 \end{bmatrix} \quad (13)$$

$$r = \begin{bmatrix} \cos\theta & -\sin\theta \\ \sin\theta & \cos\theta \end{bmatrix},$$

$$\vec{t} = \begin{bmatrix} t_x \\ t_y \end{bmatrix},$$

$$k = \begin{bmatrix} \alpha & \tan\phi \\ 0 & 1 \end{bmatrix},$$

$$\vec{v} = \begin{bmatrix} v_x \\ v_y \end{bmatrix},$$

$$I = \begin{bmatrix} 1 & 0 \\ 0 & 1 \end{bmatrix},$$

$$\vec{0} = \begin{bmatrix} 0 \\ 0 \end{bmatrix}$$

where
$t_x$ . . . horizontal translational motion amount
$t_y$ . . . vertical translational motion amount
$\theta$ . . . rotation angle
$v_x$ . . . horizontal perspective component amount
$v_y$ . . . vertical perspective component amount
$\alpha$ . . . anisotropic magnification of shear component
$\phi$ . . . directional angle of shear component Solving the equation of each deformation component using equations (11), (12), and (13) yields:

$$t_x = f(\tan\theta_y \cos\theta_r / \cos\theta_p + \tan\theta_p \sin\theta_r) \quad (14)$$

$$t_y = f(-\tan\theta_y \sin\theta_r / \cos\theta_p + \tan\theta_p \cos\theta_r) \quad (15)$$

$$\theta = -\theta_r \quad (16)$$

$$v_x = -\tan\theta_y / f \quad (17)$$

$$v_y = -\tan\theta_p / (f \cos\theta_y) \quad (18)$$

$$s = (\cos\theta_y \cos\theta_p)^{-3/2} \quad (19)$$

$$\alpha = (\cos\theta_p / \cos\theta_y)^{1/2} \quad (20)$$

$$\tan\phi = \sin\theta_y \sin\theta_p / \cos\theta_y \cos\theta_p)^{1/2} \quad (21)$$

In this embodiment, the processing of the image deformation amount calculation unit 200 simplifies calculation, as will be described below.

A rotational shake which acts on the image capture apparatus is not so large except when the user intentionally operates the image capture apparatus, such as panning. When γ represents the angle of a shake acting on the image capture apparatus, cos γ=1, sin γ tan γ=0, and sin γ sin γ=0 are obtained by approximation. In this case, equations (14) to (21) can be approximated by:

$$t_x = f \tan\theta_y \quad (22)$$

$$t_y = f \tan\theta_p \quad (23)$$

$$\theta = -\theta_r \quad (24)$$

$$v_x = -\tan\theta_y / f \quad (25)$$

$$v_y = -\tan/\theta_p/f \quad (26)$$

$$s = 1 \quad (27)$$

$$\alpha = 1 \quad (28)$$

$$\tan\phi = 0 \quad (29)$$

In this case, the enlargement/reduction component is 1 according to equation (27). The anisotropic magnification of the shear component is 1 and the directional angle of the shear component is 0° according to equations (28) and (29). That is, among deformation components of the captured image due to a rotational shake acting on the image capture apparatus, the enlargement/reduction component and shear component are smaller than the remaining deformation components.

Therefore, the processing of the image deformation amount calculation unit 200 according to this embodiment does not correct the enlargement/reduction and shear components, and corrects only the translational motion, rotation, and perspective components.

The components of the image deformation amount calculation unit 200 and examples of their operations according to this embodiment will be described in detail below with reference to a block diagram shown in FIG. 3. Note that a rotational shake in the yaw direction causes a horizontal translation component and a horizontal perspective component according to equations (22) and (25). A rotational shake in the pitch direction causes a vertical translation component and a vertical perspective component according to equations (23) and (26). The same processing is performed for the translational motion and perspective components caused by the rotational shake in the yaw direction and those caused by the rotational shake in the pitch direction. Therefore, only a control operation for one of the rotational shake in the yaw direction and that in the pitch direction will be explained.

Figure 3:
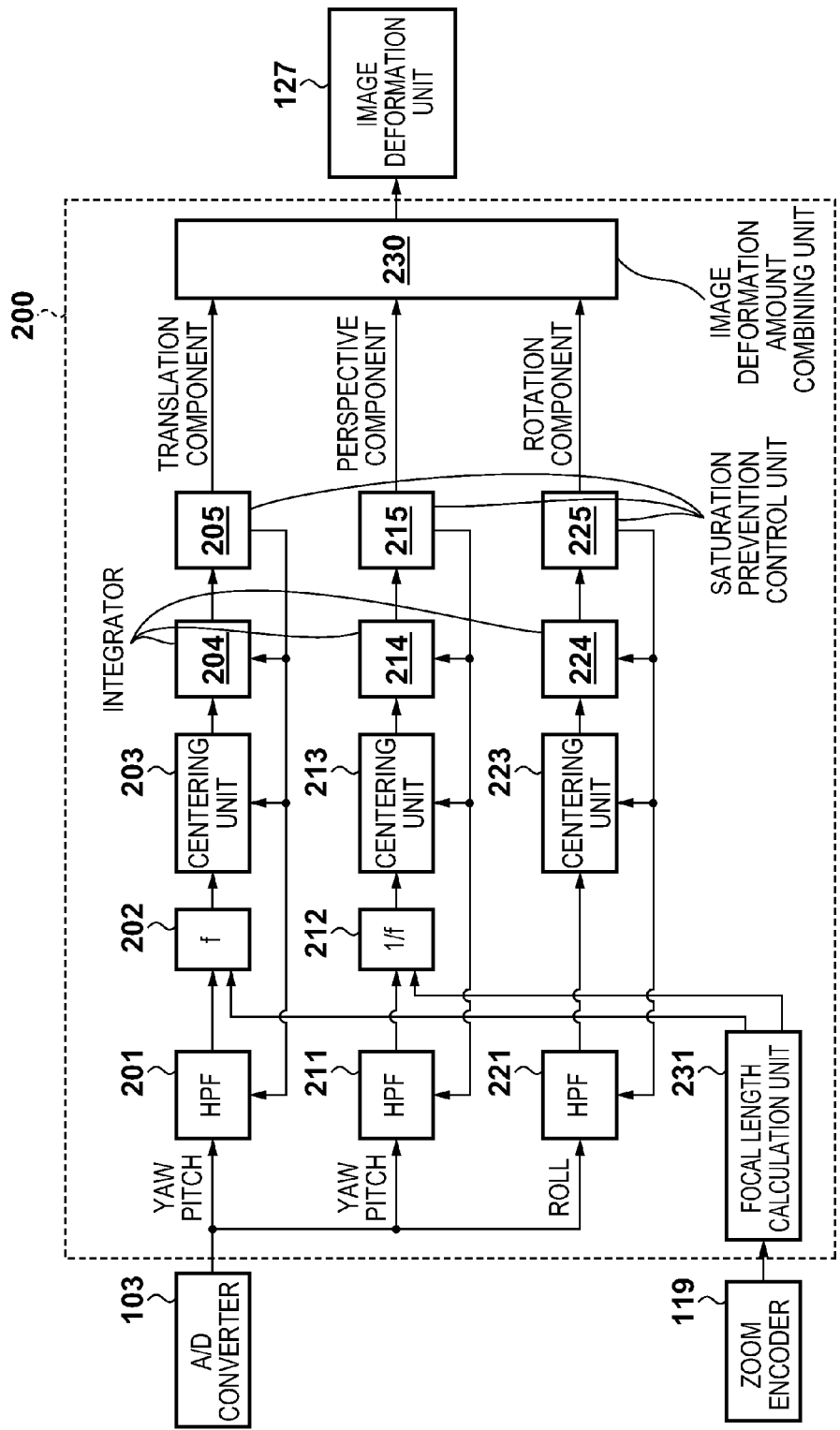
FIG. 3 is a block diagram showing an example of the arrangement of an image deformation amount calculation unit according to the first embodiment.

In the block diagram shown in FIG. 3, blocks 201 to 205 are used to calculate a correction amount for correcting translational motion blur (image blur due to the translation component of a shake). Blocks 211 to 215 are used to calculate a correction amount for correcting elevation blur (image blur due to the perspective component of the shake). Blocks 221 to 225 are used to calculate a correction amount for correcting rotation blur (image blur due to the rotation component of the shake).

The blocks 201 to 205 used to calculate the correction amount of the translational motion blur (image blur due to the translation component of the shake) will be described first.

Among outputs from the above-described A/D converter 103, angular velocity data in the yaw or pitch direction is supplied to the HPF 201 (high-pass filter). The HPF 201 has a function of changing its characteristic in an arbitrary frequency band. The HPF 201 outputs a signal in a high frequency band by cutting off low-frequency components contained in the angular velocity data. Note that the HPF 201 is not essential in this embodiment, and the output from the A/D converter 103 may be directly supplied to the focal length multiplication unit 202.

A focal length calculation unit 231 calculates the focal length of the imaging optical system 120 from the output of the above-described zoom encoder 119, and sets a focal length used for calculation of the focal length multiplication unit 202 and focal length division unit 212. The focal length multiplication unit 202 multiplies the output of the HPF 201 by the focal length f calculated by the focal length calculation unit 231, and then supplies the result to the centering unit 203.

When panning or a rotational shake which is too large to be corrected is generated in the yaw or pitch direction of the image capture apparatus 100, the centering unit 203 adds an input value (to be referred to as a centering amount hereinafter) to the output of the focal length multiplication unit 202 so as to return the correction amount to zero. Note that the centering unit 203 is not essential in this embodiment, and the output from the focal length multiplication unit 202 may be directly supplied to the integrator 204.

The integrator 204 has a function of changing its characteristic in an arbitrary frequency band. The integrator 204 integrates the output from the centering unit 203, and supplies the result to the saturation prevention control unit 205.

The saturation prevention control unit 205 controls to limit the output of the integrator 204 to a value smaller than a predetermined value (to be referred to as a limiter value hereinafter). Furthermore, when the output of the integrator 204 becomes close to the limiter value, the saturation prevention control unit 205 performs a control operation, for example, changes the cutoff frequency of the HPF 201 toward the high frequency side, shortens the time constant of the integrator 204, or increases the centering amount of the centering unit 203. The output of the saturation prevention control unit 205 (translation component correction amount calculation unit) is a final translational motion correction amount, and is supplied to an image deformation amount combining unit 230.

The blocks 211 to 215 used to calculate the correction amount of the elevation blur (image blur due to the perspective component of the shake) will be described next. The blocks 211 to 215 execute the same processes as those of the blocks 201 to 205 except for processes by the focal length multiplication unit 202 and focal length division unit 212. Only the focal length division unit 212 will thus be explained, and a description of the remaining blocks will be omitted.

The focal length division unit 212 divides the output of the HPF 211 by the focal length f calculated by the focal length calculation unit 231, and supplies the result to the centering unit 213. Division by the focal length f is performed according to equations (25) and (26) for the perspective component. The output of the saturation prevention control unit 215 is a final perspective component correction amount, and is supplied to the image deformation amount combining unit 230.

The blocks 221 to 225 used to calculate the correction amount of the rotation blur (image blur due to the rotation component of the shake) will now be explained.

Among the outputs from the above-described A/D converter 103, angular velocity data in the roll direction is supplied to the HPF 221. The HPF 221 has a function of changing its characteristic in an arbitrary frequency band. The HPF 221 outputs a signal in a high frequency band by cutting off low-frequency components contained in the angular velocity data. Note that the HPF 221 is not essential in this embodiment, and the output from the A/D converter 103 may be directly supplied to the centering unit 223.

When a rotational shake which is too large to be corrected is generated in the roll direction of the image capture apparatus 100, the centering unit 223 adds a centering amount to the output of the HPF 221, similarly to the centering units 203 and 213. Note that the centering unit 223 is not essential in this embodiment, and the output from the HPF 221 or A/D converter 103 may be directly supplied to the integrator 224.

The integrator 224 has a function of changing its characteristic in an arbitrary frequency band. The integrator 224 integrates the output from the centering unit 223, and supplies the result to the saturation prevention control unit 225.

The saturation prevention control unit 225 controls to limit the output of the integrator 224 to a value smaller than a predetermined limiter value. Furthermore, when the output of the integrator 224 becomes close to the limiter value, the saturation prevention control unit 225 performs a control operation, for example, changes the cutoff frequency of the HPF 221 toward the high frequency side, shortens the time constant of the integrator 224, or increases the centering amount of the centering unit 223. The output of the saturation prevention control unit 225 is a final rotation correction amount, and is supplied to the image deformation amount combining unit 230.

The image deformation amount combining unit 230 combines the translational motion correction amount, perspective component correction amount, and rotation correction amount which have been output from the saturation prevention control units 205, 215, and 225, respectively. More specifically, the projective transformation matrix in expression (1) is calculated according to equation (13). Assume, in this case, that the enlargement/reduction and shear deformation amounts have values represented by equations (27), (28), and (29), respectively. The image deformation amount combining unit 230 outputs the value of each element of the calculated projective transformation matrix to the image deformation unit 127. The image deformation unit 127 corrects blur by image deformation based on the output of the image deformation amount combining unit 230.

As described above, in the first embodiment of the present invention, the saturation prevention control units 205, 215, and 225 are provided for the translation component, perspective component, and rotation component, respectively. When an excessive shake of the image capture apparatus 100 is generated, a control operation for limiting the correction amount of each deformation component to a value smaller than the limiter value is performed. This can minimize the number of extra pixels necessary for each deformation component, and maintain the number of pixels which can be output from the image deformation unit 127 as many as possible, thereby minimizing degradation in image quality.

Note that although the output of the angular velocity sensor 102 is used to calculate the correction amount of each of the translation component, perspective component, and rotation component in this embodiment, various modifications can be made. For example, an acceleration sensor may be used, or a method of detecting a motion vector from an image and estimating each deformation component based on the motion vector may be used, as disclosed in Japanese Patent Laid-Open No. 2011-29735.

Second Embodiment

Figure 4:
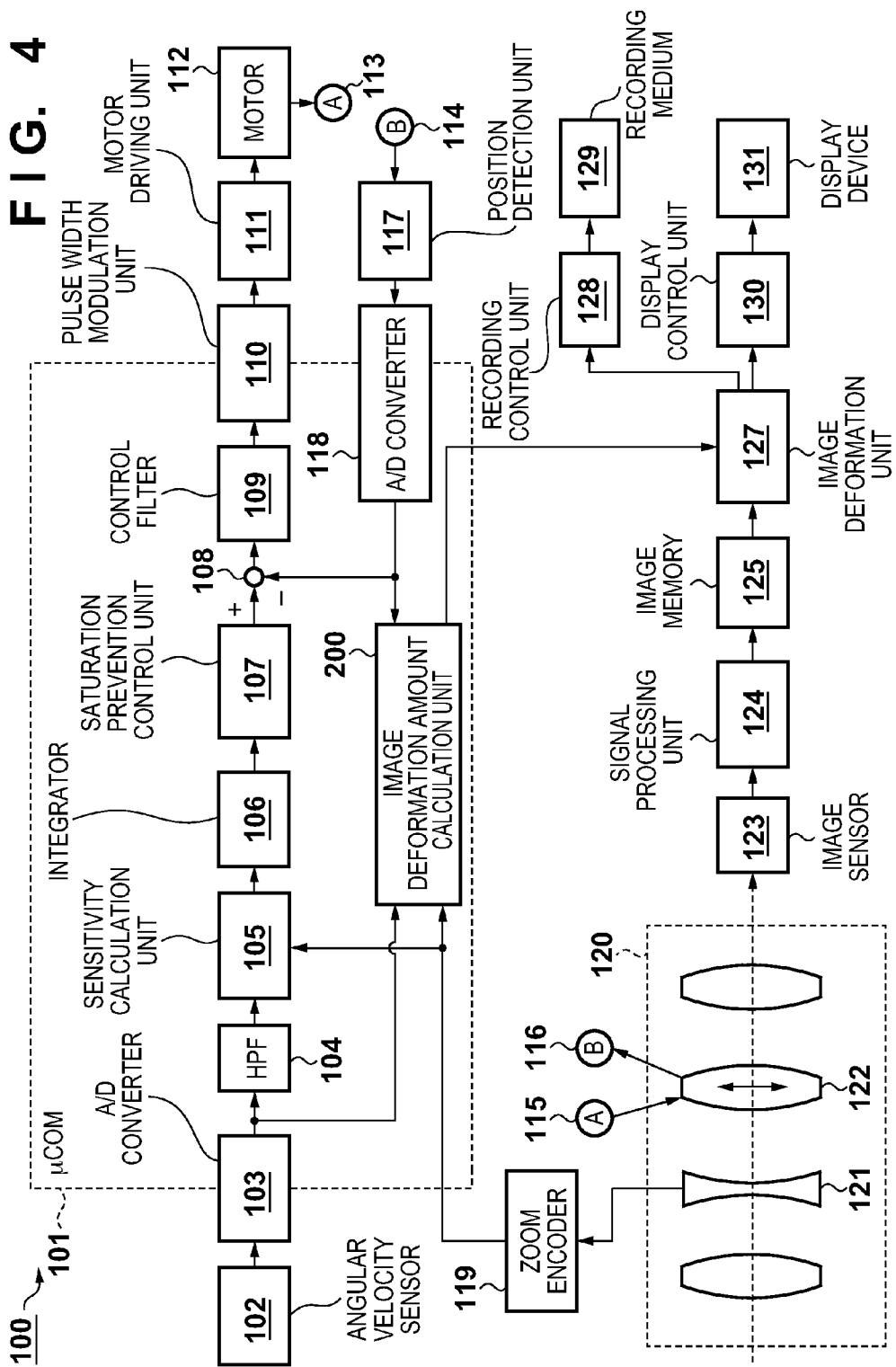
FIG. 4 is a block diagram showing an example of the arrangement of a video camera as an example of an image capture apparatus according to a second embodiment.

FIG. 4 is a block diagram showing the arrangement of a video camera as an example of an image capture apparatus according to the second embodiment of the present invention. Note that in FIG. 4, the same components as those shown in FIG. 1 have the same reference numerals and a description thereof will be omitted. FIG. 4 shows the arrangement in which an optical correction system 122 (optical correction unit) for optically correcting blur of a captured image, and blocks for controlling the optical correction system 122 are added to the arrangement shown in FIG. 1.

The output of an A/D converter 103 is supplied to an image deformation amount calculation unit 200, and is also supplied to an HPF 104 in the arrangement of FIG. 4. The HPF 104 has a function of changing its characteristic in an arbitrary frequency band. The HPF 104 outputs a signal in a high frequency band by cutting off low-frequency components contained in angular velocity data from the A/D converter 103. When a large rotational shake such as panning is generated in an image capture apparatus 100, the cutoff frequency of the HPF 104 is set to a value higher than that for a small rotational shake.

A sensitivity calculation unit 105 calculates, in accordance with the output of a zoom encoder 119, a coefficient used to calculate the optimum driving amount of the optical correction system 122 for each zoom position, multiplies the output of the HPF 104 by the coefficient, and supplies the result to an integrator 106. The integrator 106 has a function of changing its characteristic in an arbitrary frequency band. The integrator 106 integrates the output from the sensitivity calculation unit 105, and supplies the result to a saturation prevention control unit 107. When a large rotational shake such as panning is generated in the image capture apparatus 100, the time constant of the integrator 106 is set to a value shorter than that for a small rotational shake.

When the output of the integrator 106 is larger than a predetermined limiter value, the saturation prevention control unit 107 limits the output of the integrator 106 to a value smaller than the limiter value, and supplies the limited output to a subtracter 108.

The subtracter 108 subtracts digital data, obtained by causing an A/D converter 118 to A/D-convert the output of a position detection unit 117 for detecting the position of the optical correction system 122, from the output of the saturation prevention control unit 107, and supplies deviation data as the result to a control filter 109. A terminal A 113 and a terminal A 115 indicate that they are electrically connected to each other. A terminal B 114 and a terminal B 116 indicate that they are electrically connected to each other.

The control filter 109 includes an amplifier which amplifies input data by a predetermined gain, and a phase compensation filter. The deviation data supplied from the subtracter 108 undergoes signal processing by the amplifier and phase compensation filter in the control filter 109, and is then output to a pulse width modulation unit 110.

The pulse width modulation unit 110 modulates the data supplied through the control filter 109 to a waveform (that is, PWM waveform) which changes the duty ratio of a pulse wave, and supplies the waveform to a motor driving unit 111. A motor 112 is a voice coil motor used to drive the optical correction system 122. When the motor 112 is driven by the motor driving unit 111, the optical correction system 122 moves in a direction perpendicular to the optical axis. The terminal A 113 and terminal A 115 indicate that they are electrically connected to each other.

The position detection unit 117 includes a magnet and a Hall sensor provided at a position facing the magnet. The position detection unit 117 detects the moving amount of the optical correction system 122 in a direction perpendicular to the optical axis, and supplies the detection result to the above-described subtracter 108 via the A/D converter 118. This constitutes a feedback control system which causes the moving amount of the optical correction system 122 in a direction perpendicular to the optical axis to follow the output of the saturation prevention control unit 107. The output of the A/D converter 118 is supplied not only to the subtracter 108 but also to an image deformation amount calculation unit.

The optical correction system 122 (optical image stabilization means) serves as an image stabilization unit including, for example, an image stabilization lens and a holding member which holds the image stabilization lens. The optical correction system 122 moves in a direction perpendicular to the optical axis to deflect the optical axis, thereby enabling image stabilization. As a result of movement of the optical correction system 122, an image in which blur of an object on an imaging plane in the translational motion direction caused by a shake of the image capture apparatus 100 has been corrected is formed on an image sensor 123.

Figure 5:
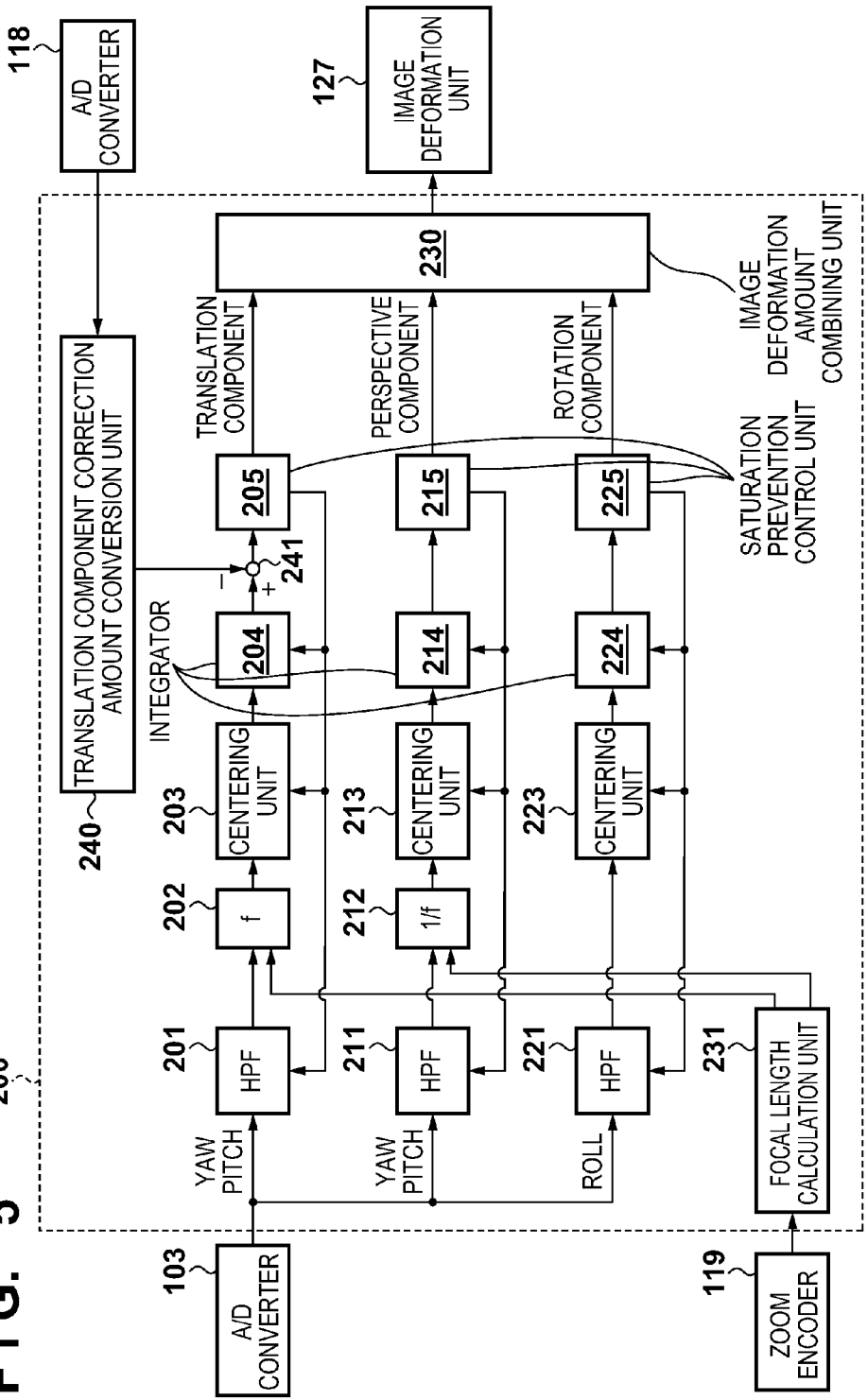
FIG. 5 is a block diagram showing an example of the arrangement of an image deformation amount calculation unit according to the second embodiment.

The components of an image deformation amount calculation unit 200 and examples of their operations according to this embodiment will be described in detail below with reference to a block diagram shown in FIG. 5. Note that in FIG. 5, the same components as those shown in FIG. 3 have the same reference numerals and a description thereof will be omitted. FIG. 5 shows the arrangement of the image deformation amount calculation unit 200 in which a translational motion correction amount conversion unit 240 and subtracter 241 are added to the arrangement shown in FIG. 3.

By using the output of the A/D converter 118, the translational motion correction amount conversion unit 240 calculates a translational motion correction amount on the imaging plane, which has been corrected by the optical correction system 122. In the image stabilization processing by the optical correction system 122, it is possible to optically correct blur in the translational motion direction among the respective deformation components of blur on the imaging plane. The translational motion correction amount is calculated using all output data from an angular velocity sensor as described with reference to FIGS. 2A and 2B, resulting in over-correction. In the arrangement shown in FIG. 5, the translational motion correction amount conversion unit 240 calculates the translational motion correction amount of the optical correction system 122, and the subtracter 241 subtracts the calculated translational motion correction amount from the output of an integrator 204. Consequently, an image deformation unit 127 corrects (electrically corrects) only a translational motion correction amount which could not be corrected by the optical correction system 122.

As described above, according to the second embodiment of the present invention, in addition to the arrangement of the first embodiment, the optical correction system 122 optically corrects translational motion blur (image blur due to the translation component of a shake). This can limit the number of extra pixels necessary for deformation in the translational motion direction to a smaller number, and maintain the number of pixels which can be output from the image deformation unit 127 as many as possible, thereby minimizing degradation in image quality.

Note that in the second embodiment, the optical correction system 122 has been exemplified as optical image stabilization means. The present invention, however, is not limited to this. For example, various kinds of image stabilization means such as a method of driving the image sensor 123 and a method using a prism can be used.

Third Embodiment

A second method of processing executed by the image deformation amount calculation unit 200 of the image capture apparatus 100 according to the first embodiment of the present invention shown in FIG. 1 will be described in detail below with reference to the accompanying drawings.

The correspondence between a translation component and a perspective component which are image deformation components caused by a rotational shake acting on the image capture apparatus will now be explained. According to equations (22) and (25), each of the horizontal translation component and horizontal perspective component is a function of an angle $\theta_y$. Furthermore, according to equations (23) and (26), each of the vertical translation component and vertical perspective component is a function of an angle $\theta_p$. This indicates that the translation component and perspective component have a correspondence. In calculation of the deformation amount of an image, therefore, it is possible to perform image stabilization with higher accuracy by controlling to maintain the correspondence between a translational motion correction amount and perspective component correction amount. In the image deformation amount calculation unit 200 shown in FIG. 3, a translational motion correction amount and perspective component correction amount are calculated independently of each other, and the correspondence between them is not considered. In this embodiment, the processing of the image deformation amount calculation unit 200 that performs a calculation, as will be described below. When the focal length f is set to 1 in equations (22), (23), (25), and (26), we have:

$$|t_x| = |v_x| \quad (30)$$

$$|t_y| = |v_y| \quad (31)$$

As indicated by equations (30) and (31), the translation component and perspective component have the same magnitude. That is, it is possible to maintain the correspondence between the image deformation amount of the translation component and that of the perspective component caused by the rotational shake by performing various calculation processes for the translational motion correction amount and perspective component correction amount with the same characteristic. Note that the focal length f is set to 1 for equations (30) and (31). If, however, a multiplication or division operation by the focal length f is performed after various calculation processes, a final translational motion correction amount and perspective component correction amount can be obtained.

Figure 6:
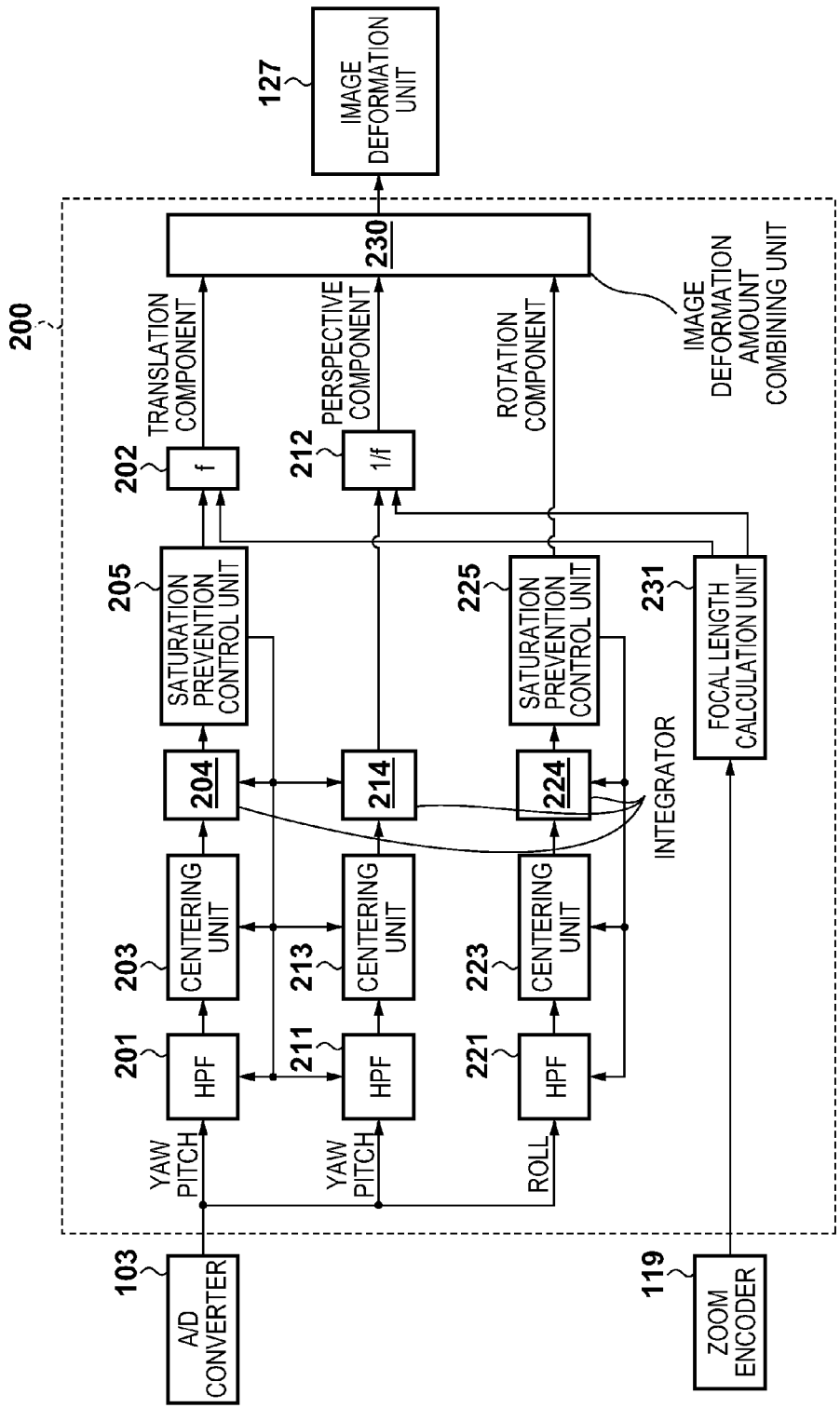
FIG. 6 is a block diagram showing an example of the arrangement of an image deformation amount calculation unit according to a third embodiment.

The components of the image deformation amount calculation unit 200 and examples of their operations according to this embodiment will be described in detail below with reference to a block diagram shown in FIG. 6. Note that in FIG. 6, the same components as those shown in FIG. 3 have the same reference numerals and a description thereof will be omitted. FIG. 6 shows the arrangement of the image deformation amount calculation unit 200 in which the saturation prevention control unit 215 used for calculation of a perspective component is deleted from the arrangement shown in FIG. 3, and an HPF 211, integrator 214, and centering unit 213 are controlled by a saturation prevention control unit 205. Furthermore, the calculation positions of a focal length multiplication unit 202 and focal length division unit 212 are different from those in FIG. 3.

When the output of an integrator 204 becomes close to a limiter value, the saturation prevention control unit 205 performs a control operation, for example, changes the cutoff frequency of an HPF 201 toward the high frequency side, shortens the time constant of the integrator 204, or increases the centering amount of a centering unit 203. An outstanding characteristic feature in this embodiment is that the saturation prevention control unit 205 controls to attenuate the correction amount so that the translational motion correction amount does not become close to the limiter value, and also controls to attenuate the correction amount for calculation of the perspective component with the same characteristic. That is, if the saturation prevention control unit 205 changes the cutoff frequency of the HPF 201 when, for example, the output of the integrator 204 becomes close to the limiter value, the cutoff frequency of the HPF 211 is changed to the same value as that of the cutoff frequency of the HPF 201. Or, if the saturation prevention control unit 205 changes the time constant of the integrator 204, it changes the time constant of the integrator 214 to the same value as that of the time constant of the integrator 204. Alternatively, if the saturation prevention control unit 205 changes the centering amount of the centering unit 203, it changes the centering amount of the centering unit 213 to the same value as that of the centering amount of the centering unit 203.

The focal length multiplication unit 202 supplies, to an image deformation amount combining unit 230, the final translational motion correction amount obtained by multiplying the output of the saturation prevention control unit 205 by the focal length f calculated by a focal length calculation unit 231.

The focal length division unit 212 supplies, to the image deformation amount combining unit 230, the final perspective component correction amount obtained by dividing the output of the integrator 214 by the focal length f calculated by the focal length calculation unit 231.

As described above, according to the third embodiment—, in addition to the arrangement of the first embodiment, the attenuation characteristic used for calculation of the perspective component correction amount is changed according to the translational motion correction amount. This makes it possible to maintain the correspondence between the translational motion correction amount and the perspective component correction amount. It is thus possible to achieve preferred image stabilization performance with a simpler arrangement. Note that in the third embodiment, the attenuation characteristic of the translational motion correction amount and that of the perspective component correction amount are changed according to the translational correction amount. However, the attenuation characteristic of the translational motion correction amount and that of the perspective component correction amount may be changed according to the perspective component correction amount.

Note also that in the third embodiment, the HPF, the integrator, or centering by subtracting an offset has been explained as a means for attenuating the correction amount. The present invention, however, is not limited to them and another filtering processing or the like may be used as long as it is possible to use the same attenuation characteristic in calculation of the translation component correction amount and that of the perspective component correction amount.

Note that although the output of an angular velocity sensor 102 is used to calculate the correction amount of each of the translation component, perspective component, and rotation component in the third embodiment, the various modifications can be made. For example, an acceleration sensor may be used, or a method of detecting a motion vector from an image and estimating each deformation component based on the motion vector may be used, as disclosed in Japanese Patent Laid-Open No. 2011-29735.

Fourth Embodiment

Figure 7:
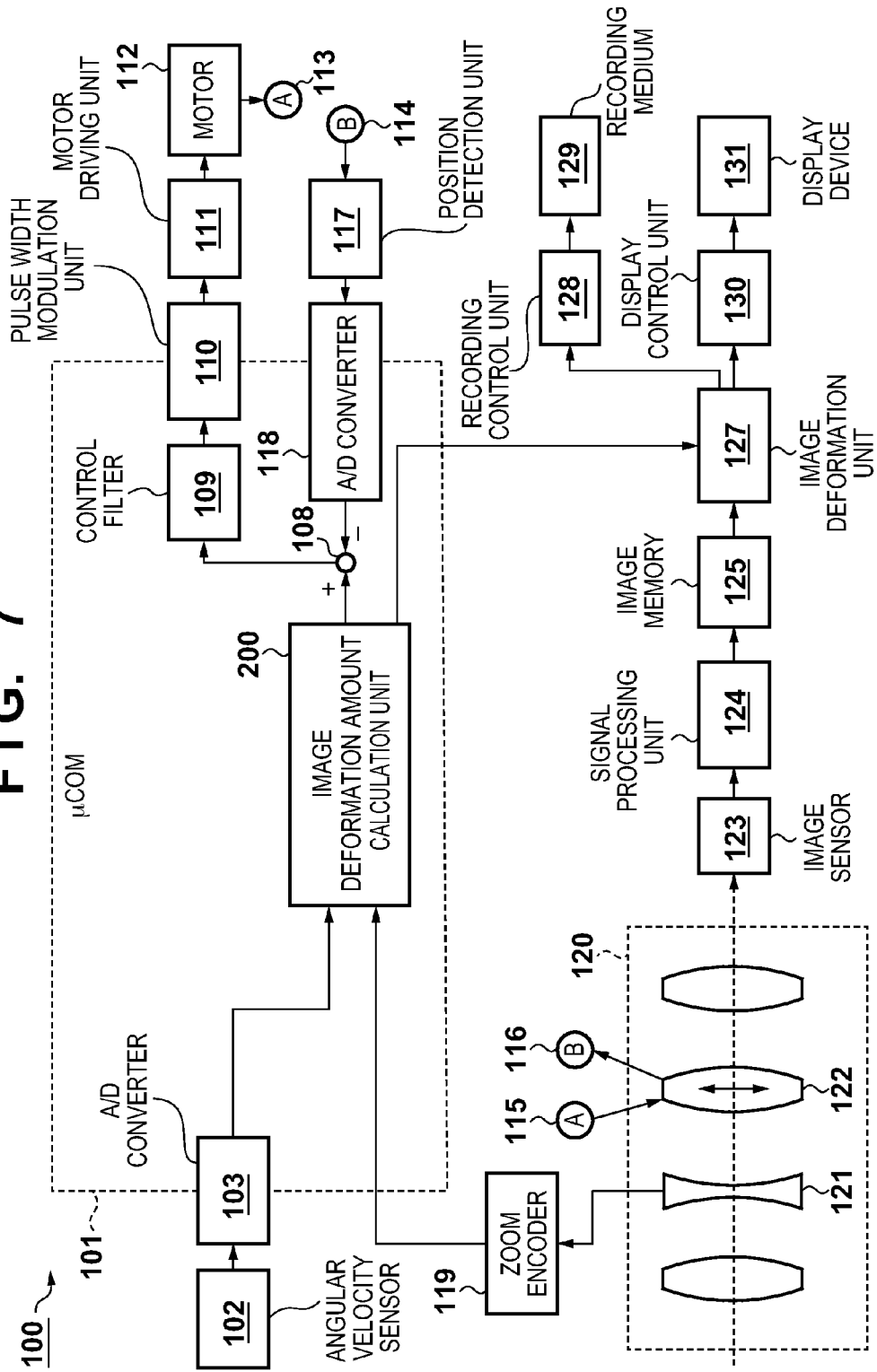
FIG. 7 is a block diagram showing an example of the arrangement of a video camera as an example of an image capture apparatus according to a fourth embodiment.

FIG. 7 is a block diagram showing the arrangement of a video camera as an example of an image capture apparatus according to the fourth embodiment of the present invention. Note that in FIG. 7, the same components as those shown in FIGS. 1 and 4 have the same reference numerals and a description thereof will be omitted. FIG. 7 shows the arrangement in which an optical correction system 122 for optically correcting blur of a captured image, and blocks for controlling the optical correction system 122 are added to the arrangement shown in FIG. 1. The optical correction system 122 is driven according to the output of an image deformation amount calculation unit 200.

Figure 8:
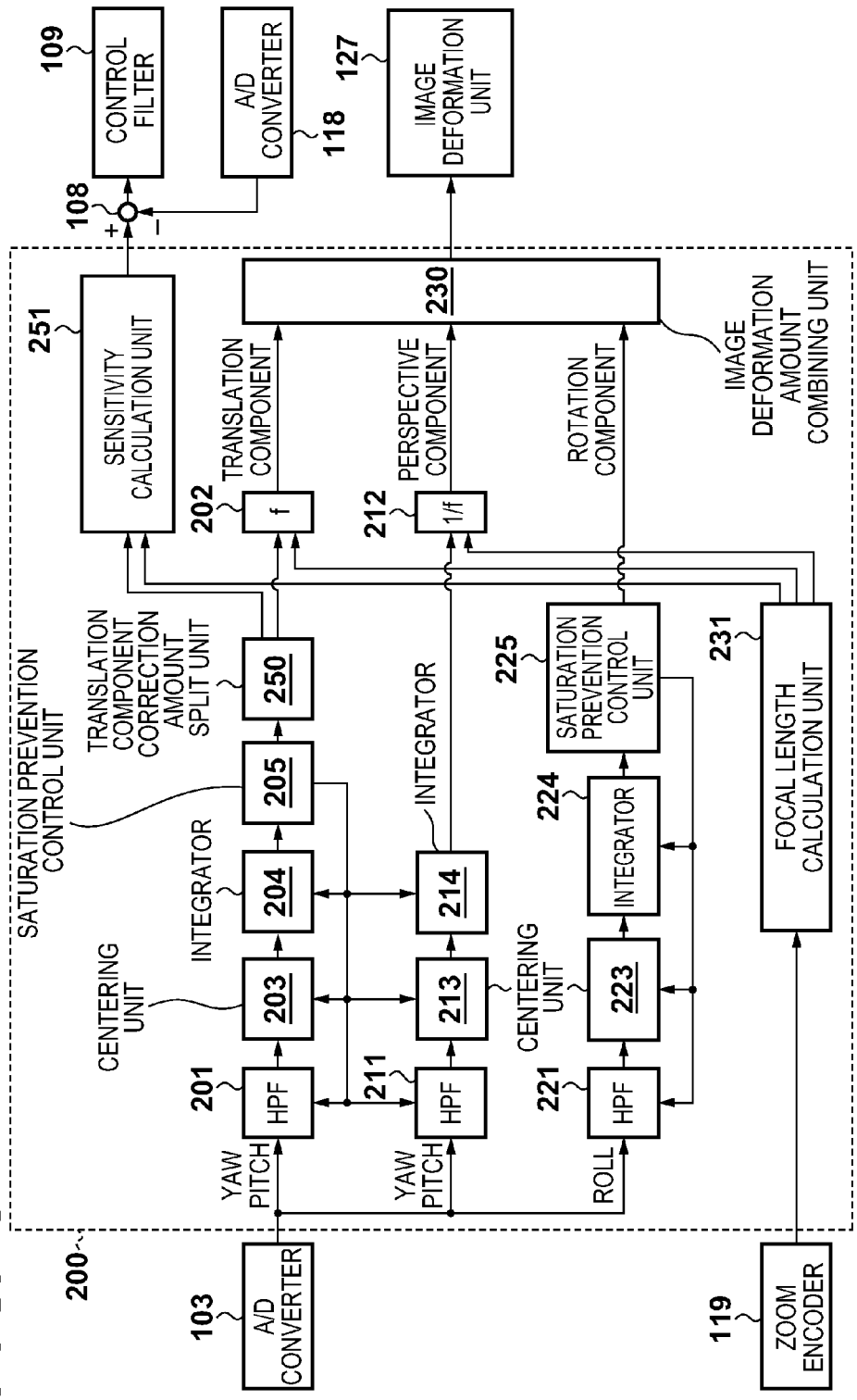
FIG. 8 is a block diagram showing an example of the arrangement of an image deformation amount calculation unit according to the fourth embodiment.

The components of the image deformation amount calculation unit 200 and examples of their operation according to this embodiment will be described in detail below with reference to a block diagram shown in FIG. 8. Note that in FIG. 8, the same components as those shown in FIG. 6 have the same reference numerals and a description thereof will be omitted. The image deformation amount calculation unit 200 shown in FIG. 8 has an arrangement in which a translational motion correction amount split unit 250 and sensitivity calculation unit 251 for calculation of a translational motion correction amount are added to the arrangement shown in FIG. 6.

The translational motion correction amount split unit 250 splits a translational motion correction amount output from a saturation prevention control unit 205 into a correction amount corrected by an image deformation unit 127 and that corrected by the optical correction system 122, and supplies them to a focal length multiplication unit 202 and sensitivity calculation unit 251, respectively. For example, t represents the output of the saturation prevention control unit 205, and A represents the correction ratio by the image deformation unit 127. In this case, a correction amount te supplied to the focal length multiplication unit 202 and a correction amount to supplied to the sensitivity calculation unit 251 are given by:

$$te = A \times t$$

$$to = (1-A) \times t \, (0 \leq A \leq 1)$$

The sensitivity calculation unit 251 calculates, in accordance with the output of a focal length calculation unit 231, a coefficient used to calculate an optimum driving amount of the optical correction system 122 for each zoom position, multiplies the output of the translational motion correction amount split unit 250 by the coefficient, and supplies the result to a subtracter 108. The subtracter 108 subtracts digital data, obtained by causing an A/D converter 118 to A/D-convert the output of a position detection unit 117 for detecting the position of the optical correction system 122, from the output of the saturation prevention control unit 251, and supplies deviation data as the result to a control filter 109. The output of the sensitivity calculation unit 251 indicates the driving target position of the optical correction system 122.

The focal length multiplication unit 202 supplies, to an image deformation amount combining unit 230, a final translational motion correction amount obtained by multiplying the output of the translational motion correction amount split unit 250 by a focal length f calculated by the focal length calculation unit 231.

In this way, it is possible to correct translational motion blur (image blur due to the translation component of a shake) among image deformation components using both image deformation and the optical correction system.

As described above, according to the fourth embodiment, in addition to the arrangement of the third embodiment, the optical correction system 122 also optically corrects the translational motion blur (image blur due to the translation component of the shake). This can limit the number of extra pixels necessary for deformation in the translational motion direction to a smaller number, and maintain the number of pixels which can be output from the image deformation unit 127 as many as possible, thereby minimizing degradation in image quality. Furthermore, the attenuation characteristic used for calculation of a perspective component correction amount is changed according to the translational motion correction amount. This makes it possible to maintain the correspondence between the translational motion correction amount and perspective component correction amount. It is thus possible to achieve preferred image stabilization performance with a simpler arrangement.

Note that in the fourth embodiment, the optical correction system 122 has been exemplified as optical image stabilization means. The present invention, however, is not limited to this. For example, various kinds of image stabilization means such as a method of driving an image sensor 123 and a method using a prism can be used.

Fifth Embodiment

A third method of processing executed by the image deformation amount calculation unit 200 of the image capture apparatus 100 shown in FIG. 1 according to the first embodiment of the present invention will be described in detail below with reference to the accompanying drawings.

The correspondence between a translation component and a perspective component which are image deformation components caused by a rotational shake acting on the image capture apparatus will now be explained. According to equations (22) and (25) and equations (23) and (26), the correspondence between the translation component and the perspective component is given by:

$$|v_x| = |t_x|/f^2 \quad (32)$$

$$|v_y| = |t_y|/f^2 \quad (33)$$

It is seen from equations (32) and (33) that the magnitude of a perspective component correction amount can be calculated by dividing a translational motion correction amount by $f^2$. That is, the perspective component correction amount can also be calculated by calculating the translational motion correction amount, and dividing the result by $f^2$.

Figure 9:
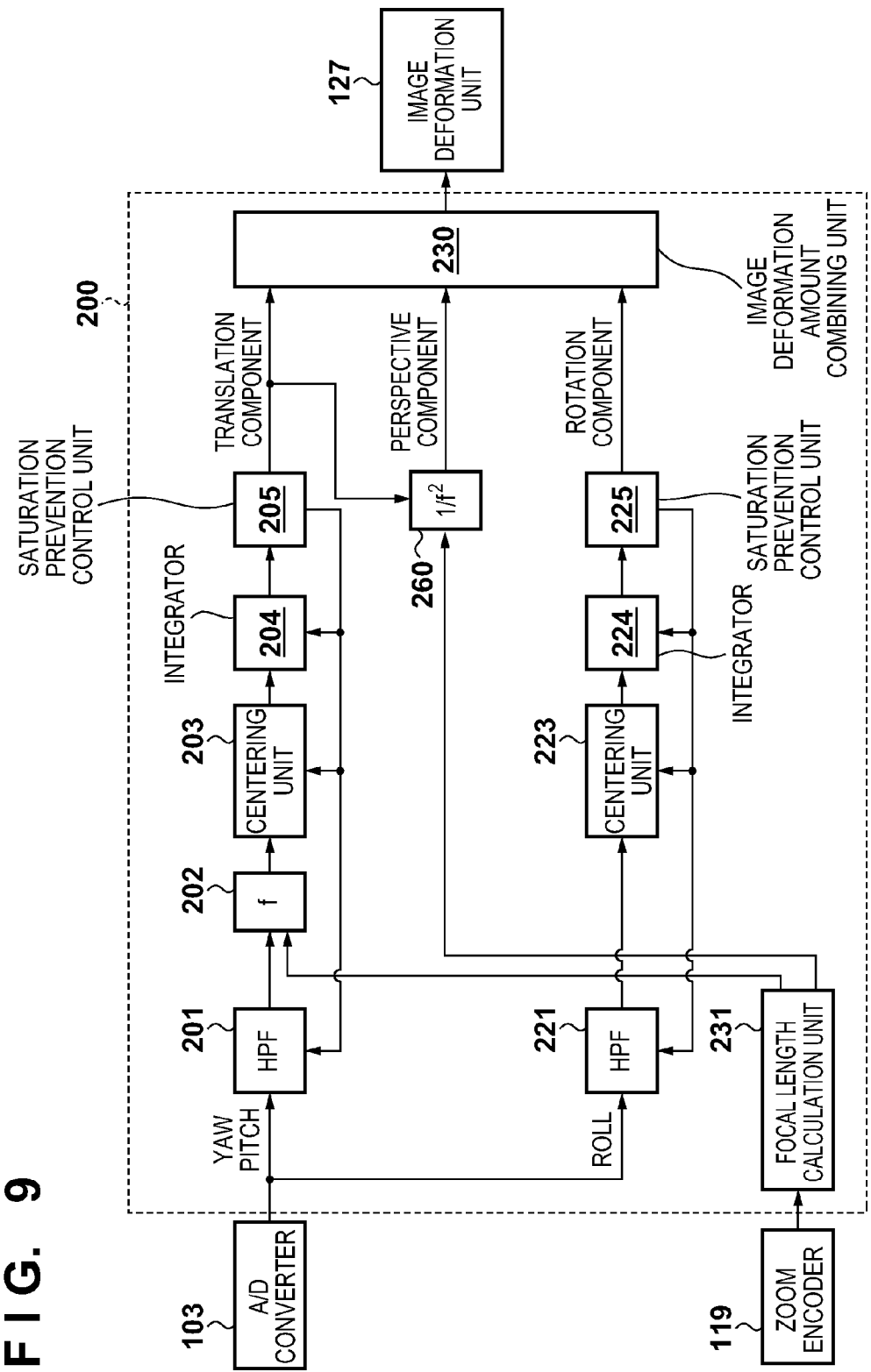
FIG. 9 is a block diagram showing an example of the arrangement of an image deformation amount calculation unit according to a fifth embodiment.

The components of an image deformation amount calculation unit 200 and examples of their operations according to this embodiment will be described in detail below with reference to a block diagram shown in FIG. 9. Note that in FIG. 9, the same components as those shown in FIG. 3 have the same reference numerals and a description thereof will be omitted. FIG. 9 shows the arrangement of the image deformation amount calculation unit 200 in which the HPF 211, focal length division unit 212, centering unit 213, integrator 214, and saturation prevention control unit 215 which are used for calculation of a perspective component are deleted from the arrangement shown in FIG. 3, and a squared focal length division unit 260 is added to the arrangement shown in FIG. 3.

The squared focal length division unit 260 calculates a perspective component correction amount by dividing, by $f^2$, a translational motion correction amount output from a saturation prevention control unit 205, and supplies the result to an image deformation amount combining unit 230. This makes it possible to maintain the correspondence between the translational motion correction amount and the perspective component correction amount with an arrangement simpler than that shown in the third embodiment of the present invention, thereby achieving preferred image stabilization performance.

Although the perspective component correction amount is calculated by dividing the calculated translational motion correction amount by $f^2$ in the block diagram shown in FIG. 9, it is possible to obtain the same effects by using a method of multiplying the calculated perspective component correction amount by $f^2$. Although FIG. 9 is a block diagram showing the arrangement of the image deformation amount calculation unit 200 based on the arrangement shown in FIG. 3, the image deformation amount calculation unit 200 may have an arrangement shown in a block diagram of FIG. 10 based on the arrangement shown in FIG. 6.

Figure 10:
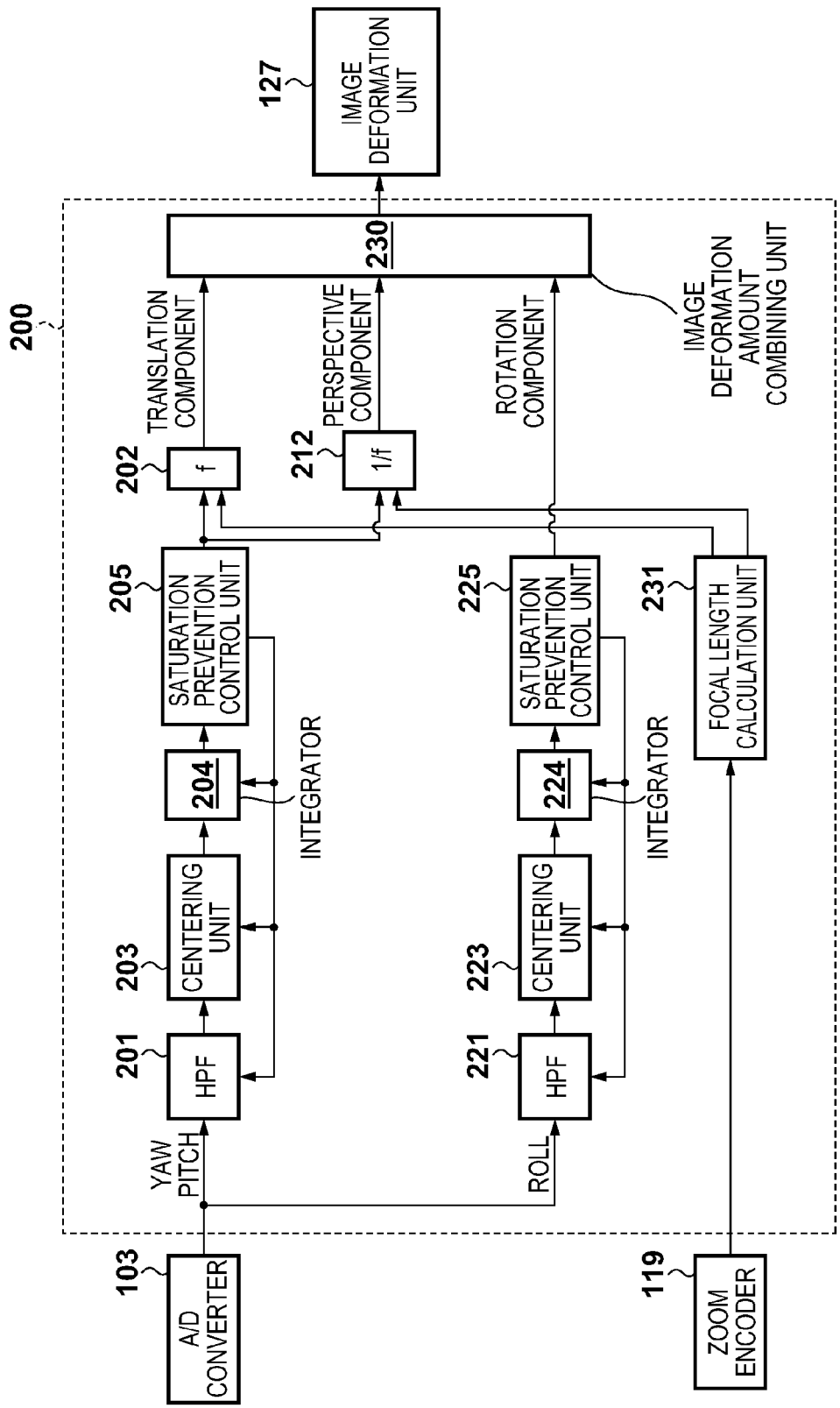
FIG. 10 is a block diagram showing another example of the arrangement of the image deformation amount calculation unit according to the fifth embodiment.

The block diagram of FIG. 10 will be explained below. In FIG. 10, the same components as those shown in FIG. 6 have the same reference numerals and a description thereof will be omitted. The arrangement of the image deformation amount calculation unit 200 shown in FIG. 10 is different from that shown in FIG. 6 in that the HPF 211, centering unit 213, and integrator 214 which are used for calculation of a perspective component are deleted, and the input to a focal length division unit 212 is changed from the output of the integrator 214 to that of a saturation prevention control unit 205.

The focal length division unit 212 calculates a perspective component correction amount by dividing, by a focal length f, a translational correction amount as the output of the saturation prevention control unit 205 (pre-calculation unit) before multiplication by the focal length f, and supplies the result to an image deformation amount combining unit 230. This makes it possible to maintain the correspondence between the translational motion correction amount and perspective component correction amount with a simple arrangement, similarly to the arrangement shown in FIG. 9, thereby achieving preferred image stabilization performance.

As described above, according to the fifth embodiment of the present invention, in addition to the arrangement of the first or third embodiment, the perspective component correction amount is calculated based on the translational motion correction amount or the translational motion correction amount is calculated based on the perspective component correction amount. This makes it possible to maintain the correspondence between the translational motion correction amount and the perspective component correction amount with an arrangement simpler than that described in the third embodiment, thereby achieving preferred image stabilization performance.

Note that although the output of an angular velocity sensor 102 is used to calculate the correction amount of each of the translation component, perspective component, or rotation component in the fifth embodiment, various modifications can be made. For example, an acceleration sensor may be used, or a method of detecting a motion vector from an image and estimating each deformation component based on the motion vector may be used, as disclosed in Japanese Patent Laid-Open No. 2011-29735.

Sixth Embodiment

A second method of processing executed by the image deformation amount calculation unit 200 of the image capture apparatus 100 shown in FIG. 4 according to the second embodiment of the present invention will be described in detail below with reference to the accompanying drawings. As described above, the image capture apparatus 100 shown in FIG. 4 has an arrangement in which the image deformation unit 127 and optical correction system 122 are used to correct translational motion blur (image blur due to the translation component of a shake) among image deformation components caused by a rotational shake acting on the apparatus.

Figure 11:
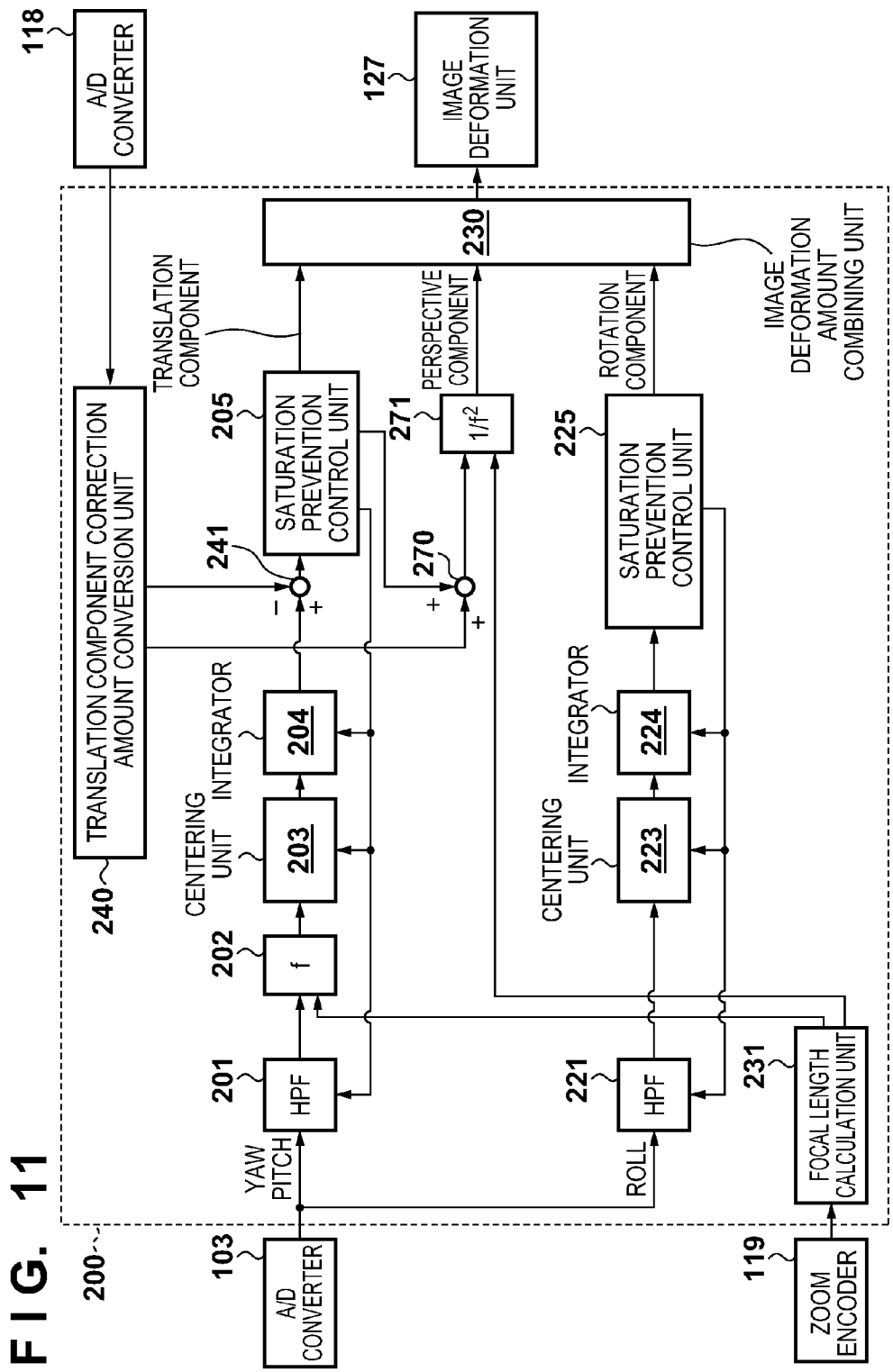
FIG. 11 is a block diagram showing an example of the arrangement of an image deformation amount calculation unit according to a sixth embodiment.

FIG. 11 is a block diagram showing an example of the arrangement of the image deformation amount calculation unit 200 of the image capture apparatus 100 shown in FIG. 4. In FIG. 11, the same components as those shown in FIG. 5 have the same reference numerals and a description thereof will be omitted. FIG. 11 shows the arrangement in which the HPF 211, focal length division unit 212, centering unit 213, integrator 214, and saturation prevention control unit 215 are deleted from the arrangement shown in FIG. 5, and an adder 270 and squared focal length division unit 271 are added to the arrangement shown in FIG. 5.

The adder 270 adds the output of the translational motion correction amount conversion unit 240, that is, a translational motion correction amount (calculation of a translational motion optical correction amount) corrected by an optical correction system 122 on an imaging plane, to the output of a saturation prevention control unit 205 (calculation of a translational motion electronic correction amount), that is, a translational motion correction amount by an image deformation unit 127, and supplies the result to the squared focal length division unit 271. The squared focal length division unit 271 calculates a perspective component correction amount by dividing, by $f^2$, a value which is obtained by adding the optical translational motion correction amount to the electronic translational motion correction amount and is output from the adder 270, and then supplies the result to an image deformation amount combining unit 230. The reason why the squared focal length division unit 271 can calculate the perspective component correction amount is as described with reference to equations (32) and (33).

Figure 12:
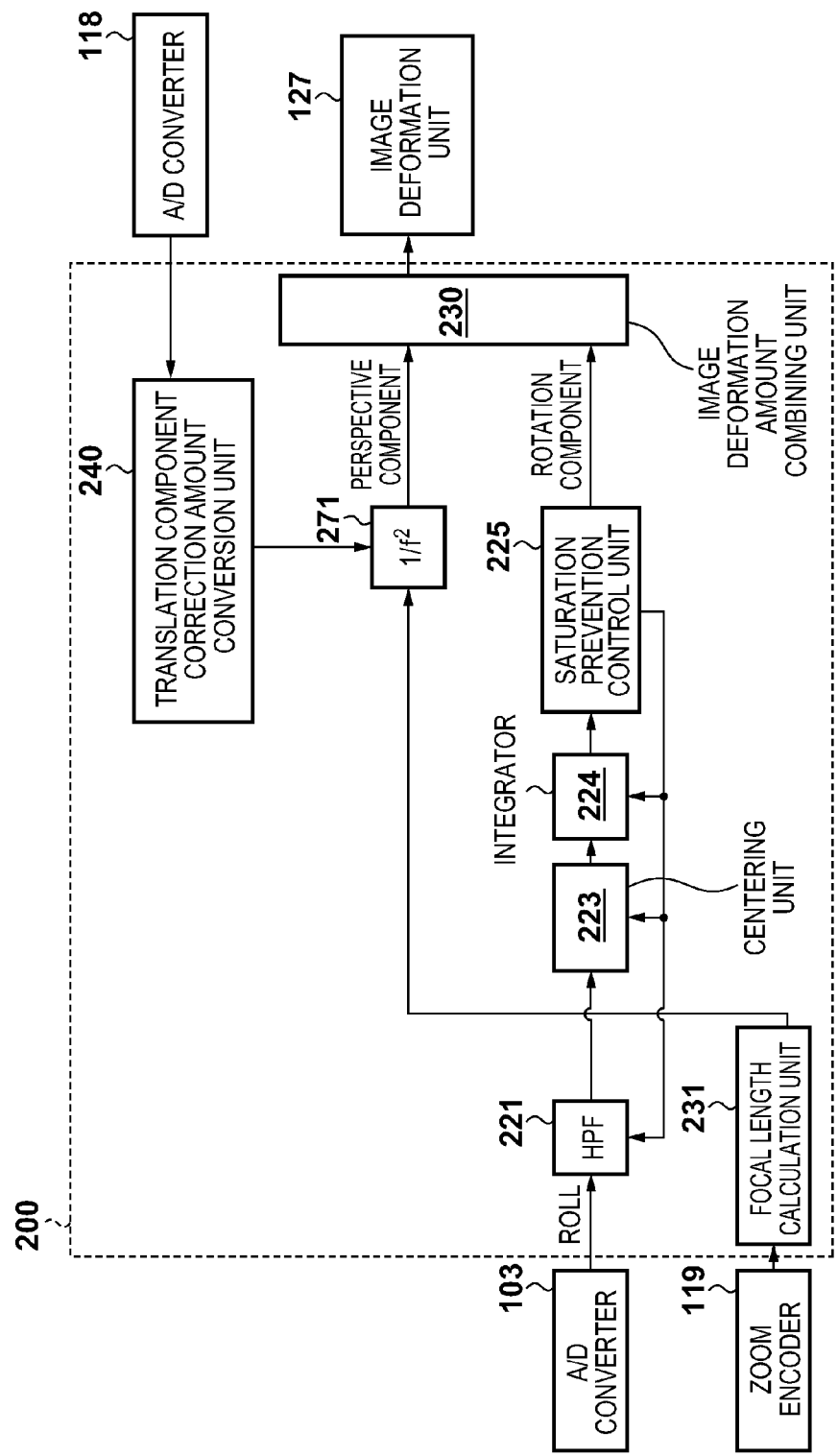
FIG. 12 is a block diagram showing another example of the arrangement of the image deformation amount calculation unit according to the sixth embodiment.

Note that in the block diagram shown in FIG. 11, the image deformation unit 127 corrects a translational motion correction amount which could not be corrected by the optical correction system 122. However, translational motion correction by the image deformation unit 127 is not essential. For example, the image deformation amount calculation unit 200 may have an arrangement shown in FIG. 12. FIG. 12 shows the arrangement in which the HPF 201, focal length multiplication unit 202, centering unit 203, integrator 204, saturation prevention control unit 205, and adder 270 are deleted from the arrangement shown in FIG. 11, and the input to the squared focal length division unit 271 is changed to the output from the translational motion correction amount conversion unit 240. That is, in the arrangement shown in FIG. 12, only an optical correction system 122 corrects blur in the translational motion direction, and a perspective component correction amount is calculated by dividing the optical translational motion correction amount by $f^2$ according to equations (32) and (33).

As described above, according to the sixth embodiment of the present invention, the optical correction system 122 also optically corrects translational motion blur (image blur due to the translation component of the shake), and a perspective component correction amount is calculated based on a value obtained by adding the optical translational motion correction amount to the electronic translational motion correction amount. Furthermore, if no electronic translational motion correction is performed, a perspective component correction amount is calculated based on the optical translational motion correction amount. This can limit the number of extra pixels necessary for deformation in the translational motion direction to a small number or zero, and maintain the number of pixels which can be output from the image deformation unit 127 as many as possible, thereby minimizing degradation in image quality. Moreover, it is possible to maintain the correspondence between the translational motion correction amount and the perspective component correction amount by configuring to calculate the perspective component correction amount based on the translational motion correction amount, thereby achieving preferred image stabilization performance with a simpler arrangement.

Note that in the sixth embodiment, the optical correction system 122 has been exemplified as optical image stabilization means. The present invention, however, is not limited to this. For example, various kinds of image stabilization means such as a method of driving an image sensor 123 and a method using a prism can be used.

Seventh Embodiment

Figure 13:
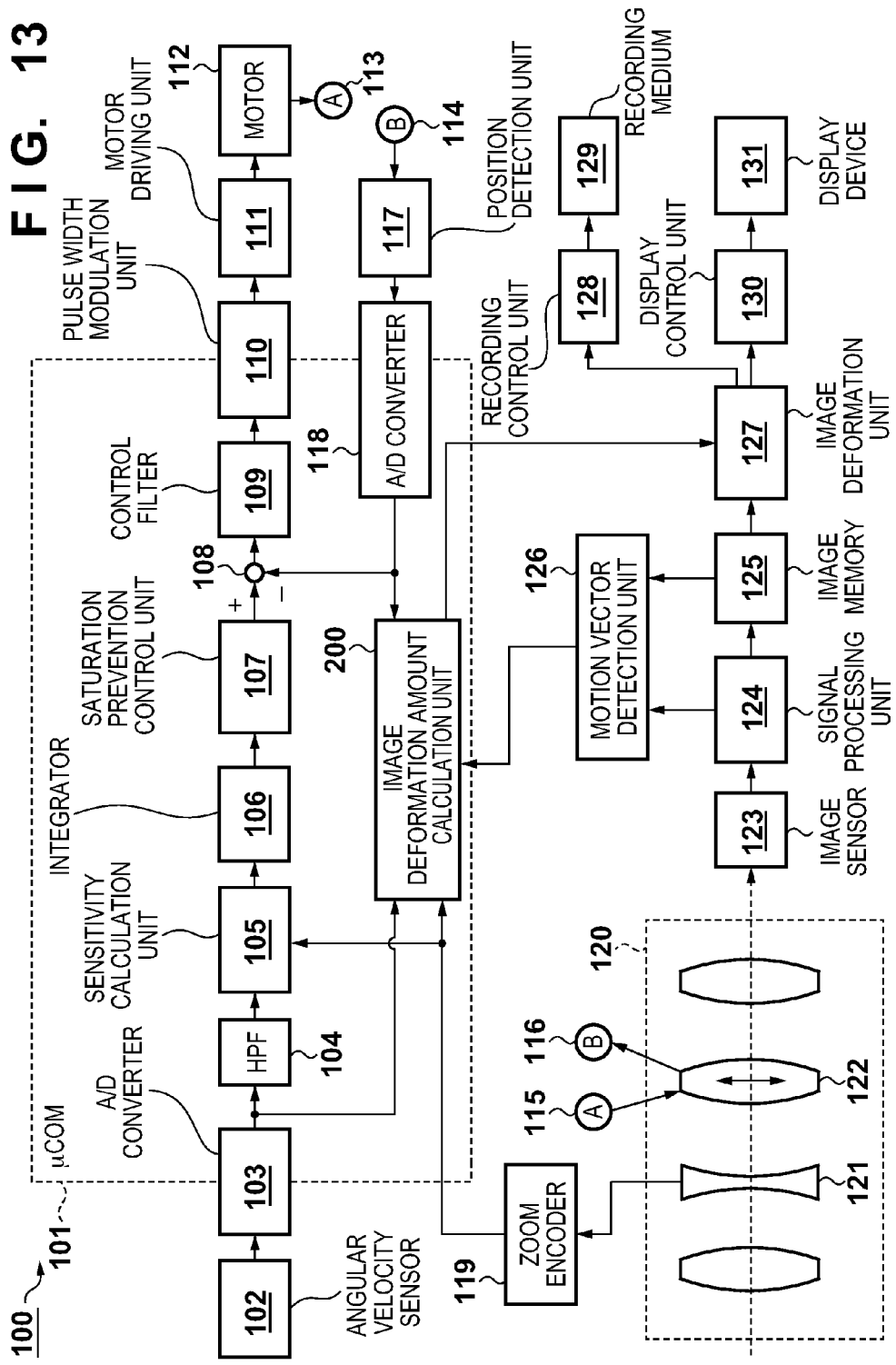
FIG. 13 is a block diagram showing an example of the arrangement of a video camera as an example of an image capture apparatus according to a seventh embodiment.

FIG. 13 is a block diagram showing the arrangement of a video camera as an example of an image capture apparatus according to the seventh embodiment of the present invention. Note that in FIG. 13, the same components as those shown in FIGS. 1, 4, and 7 have the same reference numerals and a description thereof will be omitted. FIG. 13 shows the arrangement in which a motion vector detection unit 126 is added to the arrangement shown in FIG. 4.

In an image capture apparatus 100 shown in FIG. 13, a signal processing unit 124 supplies a video signal to an image memory 125 and the motion vector detection unit 126. The motion vector detection unit 126 detects a motion vector in an image based on a luminance signal included in the current video signal generated by the signal processing unit 124 and a luminance signal included in a video signal stored in the image memory 125 of the immediately preceding field. The motion vector data detected by the motion vector detection unit 126 is supplied to an image deformation amount calculation unit 200.

The components of the image deformation amount calculation unit 200 and examples of their operations according to this embodiment will be described in detail below with reference to a block diagram shown in FIG. 14. Note that in FIG. 14, the same components as those shown in FIG. 11 have the same reference numerals and a description thereof will be omitted.

Figure 14:
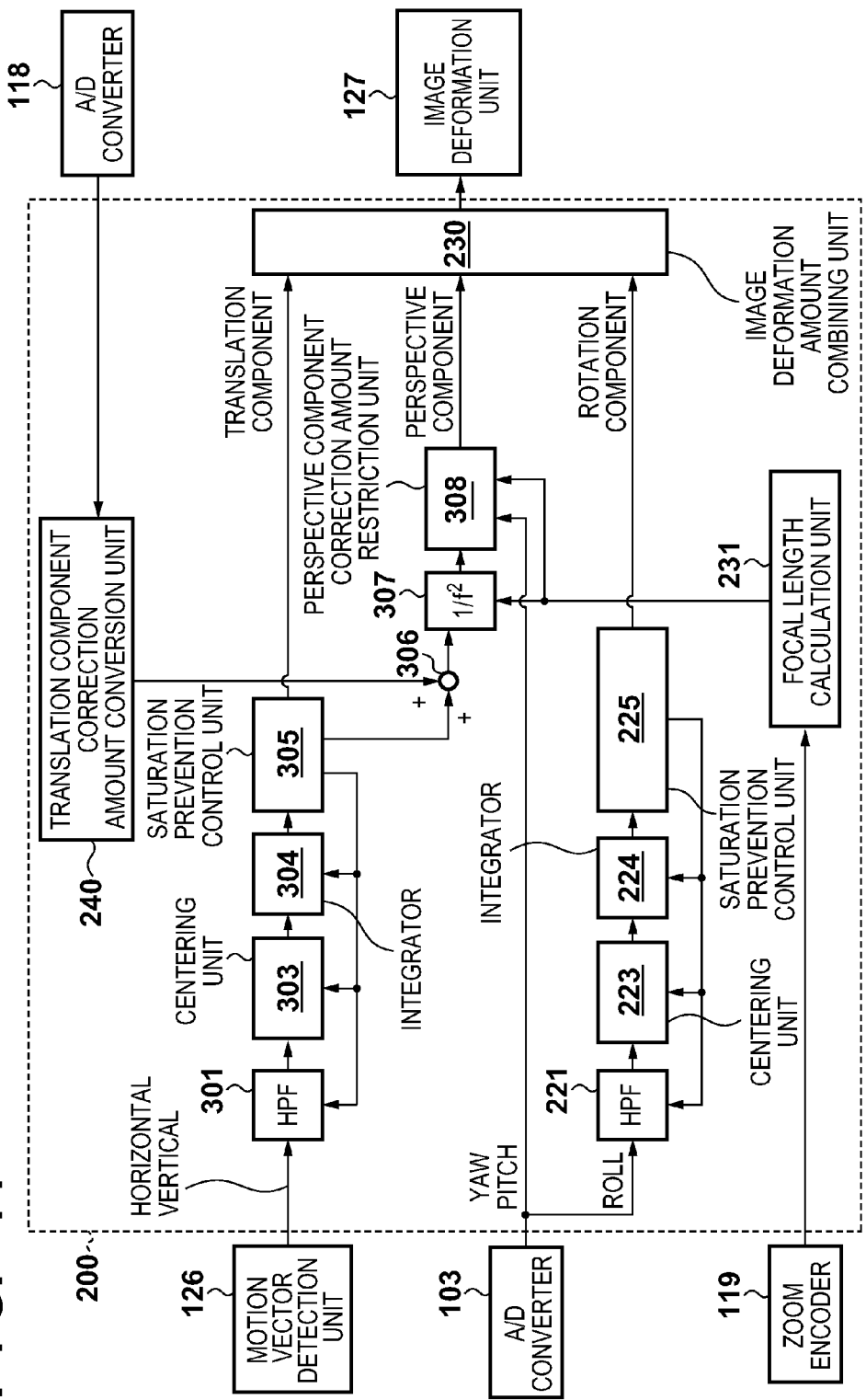
FIG. 14 is a block diagram showing an example of the arrangement of an image deformation amount calculation unit according to the seventh embodiment.

Referring to FIG. 14, a translational motion correction amount is calculated based on the output of the motion vector detection unit 126. The output of the motion vector detection unit 126 includes the amounts of translational motion blur (image blur due to the translation component of a shake) in the horizontal and vertical directions for one field, which have been calculated from the current image and the image of the immediately preceding field. Since the same processing is performed for calculation of a horizontal translational motion correction amount and calculation of a horizontal perspective component correction amount, only a control operation for one of the calculation processes will be explained below.

The output of the motion vector detection unit 126, that is, the amount of translational motion blur (image blur due to the translation component of the shake) for one field is supplied to an HPF 301. The HPF 301 has a function of changing its characteristic in an arbitrary frequency band. The HPF 301 outputs a signal in a high frequency band by cutting off low-frequency components contained in the amount of translational motion blur (image blur due to the translation component of the shake). Note that the HPF 301 is not essential in this embodiment, and the output from the motion vector detection unit 126 may be directly supplied to a centering unit 303.

If image blur which is too large to be corrected is generated due to panning or the like, the centering unit 303 adds a centering amount to the output of the HPF 301 so as to return the correction amount to zero. Note that the centering unit 303 is not essential in this embodiment, and the output from the HPF 301 may be directly supplied to an integrator 304.

The integrator 304 has a function of changing its characteristic in an arbitrary frequency band. The integrator 304 integrates the output from the centering unit 303, and supplies the result to a saturation prevention control unit 305. That is, the integrator 304 integrates the amount of translational motion blur (image blur due to the translation component of the shake) for one field, thereby calculating a correction amount necessary for correcting the translational motion blur (image blur due to the translation component of the shake).

The saturation prevention control unit 305 controls to limit the output of the integrator 304 to a value smaller than a limiter value. Furthermore, when the output of the integrator 304 becomes close to the limiter value, the saturation prevention control unit 305 performs a control operation, for example, changes the cutoff frequency of the HPF 301 toward the high frequency side, shortens the time constant of the integrator 304, or increases the centering amount of the centering unit 303. The output of the saturation prevention control unit 305 is a final translational motion correction amount, and is supplied to an image deformation amount combining unit 230.

An adder 306 adds the output of a translational motion correction amount conversion unit 240, that is, a translational motion correction amount corrected by an optical correction system 122 on an imaging plane, to the output of the saturation prevention control unit 305, that is, a translational motion correction amount in an image deformation unit 127, and supplies the result to a squared focal length division unit 307. The squared focal length division unit 307 calculates a perspective component correction amount by dividing, by $f^2$, the value obtained by adding the optical translational motion correction amount to the electronic translational motion correction amount, which has been output from the adder 306, and supplies the result to a perspective component correction amount restriction unit 308.

The reason why the squared focal length division unit 307 can calculate the perspective component correction amount based on the translational motion correction amount is as described with reference to equations (32) and (33). Equations (32) and (33) are derived from only a rotational shake without considering a parallel shake. On the other hand, the motion vector data detected by the motion vector detection unit 126 is obtained by adding the following components: a residual blur component after the optical correction system 122 corrects translational motion blur (image blur due to the translation component of the shake) of a captured image caused by a rotational shake acting on the image capture apparatus, and components of translational motion blur (an image blur due to the translation component of the shake) of the captured image caused by a parallel shake acting on the image capture apparatus. A perspective component of the captured image is generated due to not parallel shake but rotational shake acting on the image capture apparatus. If, therefore, correction is performed using the calculation result of the squared focal length division unit 307 as a final perspective component correction amount, the perspective component correction amount may be incorrect when the influence of the parallel shake is large.

To solve this problem, the perspective component correction amount restriction unit 308 places a restriction on the output of the squared focal length division unit 307 so as not to perform correction by an amount larger than the perspective component amount due to the rotational shake acting on the image capture apparatus 100. The control of the perspective component correction amount restriction unit 308 will be explained below.

Angular velocity data in the yaw or pitch direction is supplied to the perspective component correction amount restriction unit 308 from among the outputs of the A/D converter 103. The perspective component correction amount restriction unit 308 integrates the angular velocity data for one field, and calculates a shake angle for one field. Assume that θf represents the shake angle for one field. In this case, using a focal length f of an imaging optical system 120 calculated by the focal length calculation unit 231, and according to equations (25) and (26), a perspective component amount (represented by $v_f$) for one field is given by:

$$v_f = |\tan \theta_f / f| \tag{34}$$

The perspective component correction amount restriction unit 308 calculates $v_f$ using equation (34). Assume that $v_{out}(n-1)$ represents the output of the perspective component correction amount restriction unit 308 of the immediately preceding field, $v_{in}(n)$ represents the output of the squared focal length division unit 307 of the current field, and $\Delta v(n)$ represents the difference between the outputs. In this case, the perspective component correction amount restriction unit 308 calculates $$\Delta v(n) = v_{in}(n) - v_{out}(n-1) \tag{35}$$

According to the calculation results of equations (34) and (35), the perspective component correction amount restriction unit 308 decides its output $v_{out}(n)$ according to:

if $\Delta v(n) > vf$ $$v_{out}(n) = v_{out}(n-1) + v_f \tag{36}$$

else if $\Delta v(n) < -vf$ $$v_{out}(n) = v_{out}(n-1) - v_f \tag{37}$$

else $$v_{out} = v_{in}(n) \tag{38}$$

As described above, it is possible to prevent erroneous correction of an perspective component when the influence of the parallel shake is large, by causing the perspective component correction amount restriction unit 308 to restrict the perspective component correction amount based on a rotational shake calculated from the output of an angular velocity sensor 102. The output of the perspective component correction amount restriction unit 308 is a final perspective component correction amount, and is supplied to the image deformation amount combining unit 230.

As described above, according to the seventh embodiment of the present invention, translational motion blur (image blur due to the translation component of the shake) which is corrected using only the output of the angular velocity sensor 102 in the arrangement according to the sixth embodiment is corrected using the output of the motion vector detection unit 126 in addition to the output of the angular velocity sensor 102. This achieves image stabilization performance with higher accuracy by causing the motion vector detection unit 126 to detect a translation component which could not be corrected by image stabilization by the optical correction system 122, and causing the image deformation unit 127 to correct the translation component based on the detection result. Furthermore, it is possible to maintain the correspondence between a translational motion correction amount and a perspective component correction amount by calculating the perspective component correction amount based on the translational motion correction amount, thereby achieving preferred image stabilization performance with a simpler arrangement. In this case, it is possible to prevent erroneous correction of a perspective component when the influence of the parallel shake is large, by restricting the perspective component correction amount based on the output of the angular velocity sensor 102.

Note that in the seventh embodiment, the optical correction system 122 has been exemplified as optical image stabilization means. The present invention, however, is not limited to this. For example, various kinds of image stabilization means such as a method of driving the image sensor 123 and a method using a prism can be used.

Eighth Embodiment

Figure 15:
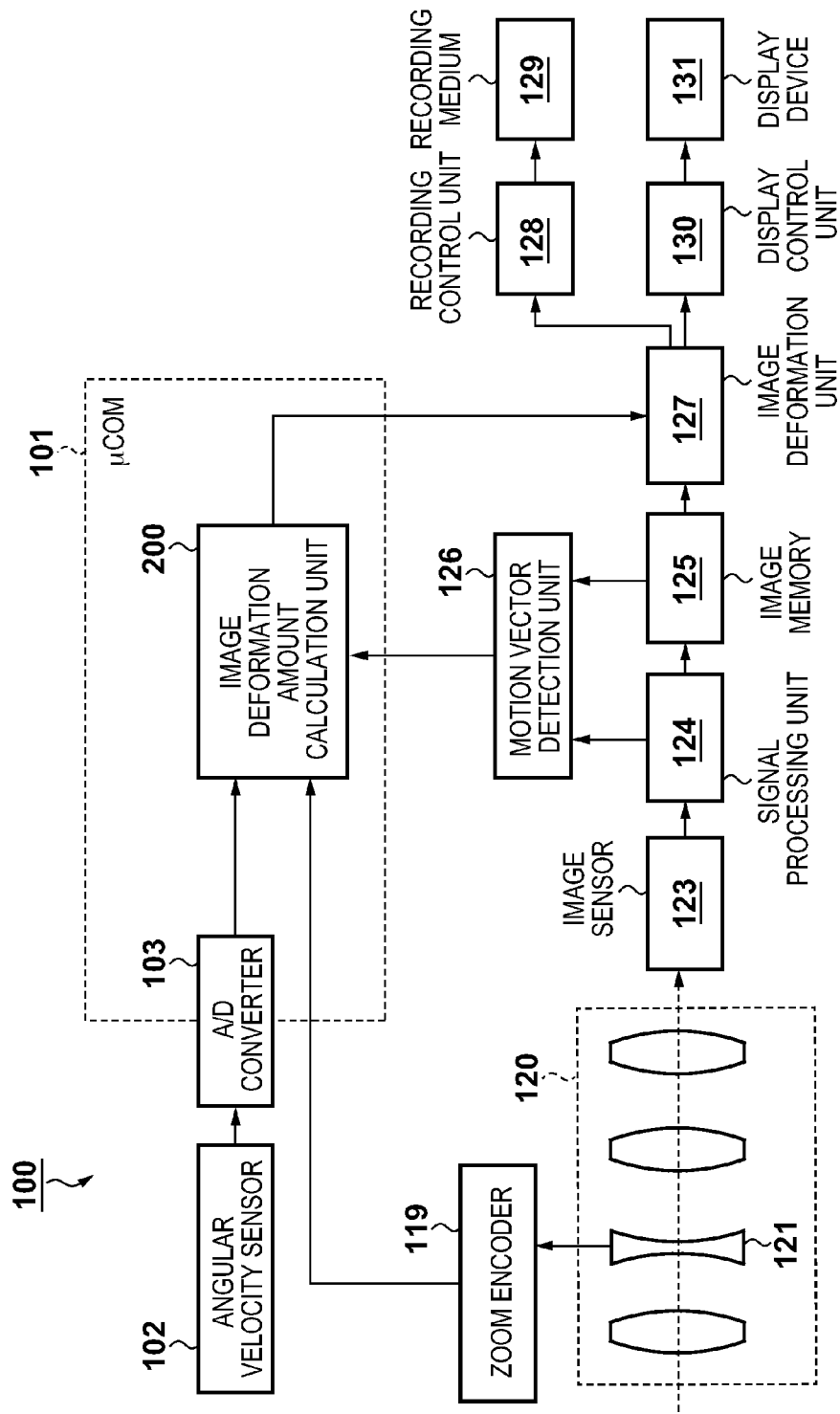
FIG. 15 is a block diagram showing an example of the arrangement of a video camera as an example of an image capture apparatus according to an eighth embodiment.

FIG. 15 is a block diagram showing the arrangement of a video camera as an example of an image capture apparatus according to the eighth embodiment of the present invention. Note that in FIG. 15, the same components as those shown in FIGS. 1 and 13 have the same reference numerals and a description thereof will be omitted. FIG. 15 shows the arrangement in which a motion vector detection unit 126 is added to the arrangement shown in FIG. 1, and is used together with an angular velocity sensor 102 to detect a shake, thereby controlling an image deformation unit.

Referring to FIG. 15, the angular velocity sensor 102 detects a shake in the rotation direction, but cannot detect a parallel shake acting on the image capture apparatus. On the other hand, motion vector data detected by the motion vector detection unit 126 is obtained by adding the following components. That is, translational motion blur (image blur due to the translation component of a shake) including translational motion blur (image blur due to the translation component of a shake) of image deformation components caused by a rotational shake and translational motion blur (image blur due to the translation component of a shake) of image deformation components caused by a parallel shake is detected. It is, therefore, possible to calculate a translational motion correction amount using the motion vector detection unit 126 in consideration of the translational motion blur (image blur due to the translation component of the shake) caused by the parallel shake as well, thereby performing image stabilization with higher accuracy.

Calculation of the perspective component correction amount will now be explained. As described above, a perspective component correction amount can be calculated based on a translational motion correction amount. The reason why it is possible to calculate the perspective component correction amount based on the translational motion correction amount is as described with reference to equations (32) and (33). Equations (32) and (33) are derived from only a rotational shake without considering a parallel shake. A perspective component of a captured image is generated due to not a parallel shake but a rotational shake acting on the image capture apparatus. If, therefore, a perspective component correction amount is calculated based on the translational motion correction amount including translational motion blur (image blur due to the translation component of the shake) caused by the parallel shake, the perspective component correction amount may have an error and thus it may be impossible to perform correct correction. To solve this problem, an image deformation amount calculation unit 200 according to this embodiment performs a calculation by separating a rotational shake from a parallel shake, thereby calculating a perspective component correction amount based on only the rotational shake.

The components of the image deformation amount calculation unit 200 and examples of their operations according to this embodiment will be described in detail below with reference to a block diagram shown in FIG. 16. Note that in FIG. 16, the same components as those shown in FIG. 11 have the same reference numerals and a description thereof will be omitted. Note also that the same processing is performed for calculation in the horizontal direction and calculation in the vertical direction. Therefore, only a control operation for one of the calculation processes will be explained below.

Figure 16:
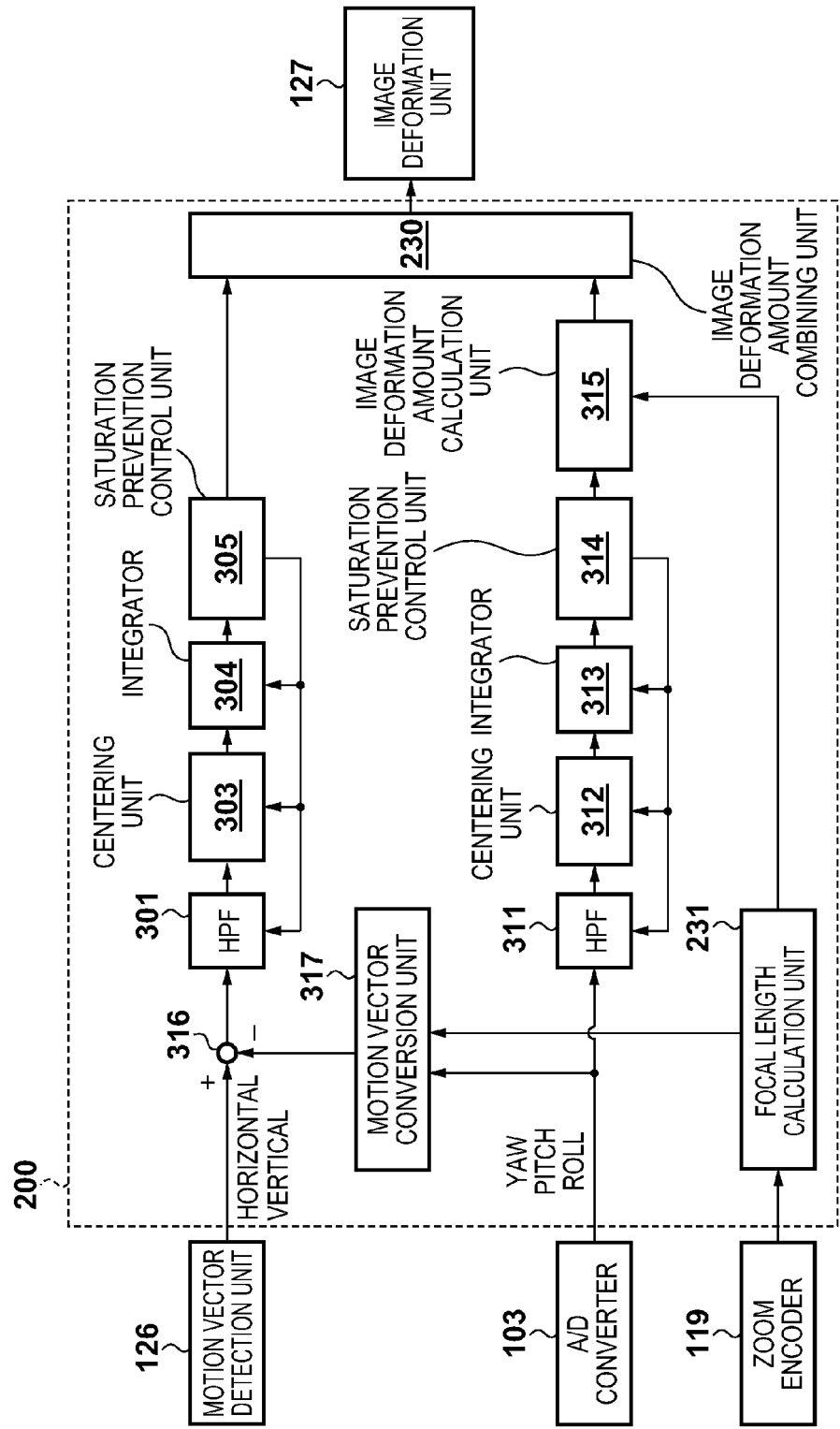
FIG. 16 is a block diagram showing an example of the arrangement of an image deformation amount calculation unit according to the eighth embodiment.

Referring to FIG. 16, blocks 301 to 305, 315, and 316 are used to calculate a translational motion correction amount due to a parallel shake. The motion vector detection unit 126 is used to calculate a translation component caused by the parallel shake. As described above, however, the motion vector detection unit 126 detects translational motion blur (image blur due to the translation component of a shake) including translational motion blur (image blur due to the translation component of a shake) caused by a rotational shake and translational motion blur (image blur due to the translation component of a shake) caused by a parallel shake, and thus cannot solely discriminate between the two kinds of translational motion blur. To do this, the output of the motion vector detection unit 126 and that of the angular velocity sensor 102 are combined to calculate the translation component caused by the parallel shake.

The output from the motion vector detection unit 126 is supplied to the motion vector subtraction unit 316, which then subtracts the output of a motion vector conversion unit 317 from the output of the motion vector detection unit 126. The motion vector conversion unit 317 converts the output of a focal length calculation unit 231 and angular velocity data output from an A/D converter 103 into an amount corresponding to translational motion blur (image blur due to the translation component of the shake) for one field according to equation (22) or (23), and outputs the result. That is, the motion vector subtraction unit 316 subtracts the translational motion blur (image blur due to the translation component of the shake) caused by the rotational shake from that detected by the motion vector detection unit 126, thereby supplying only the translational motion blur (image blur due to the translation component of the shake) caused by the parallel shake to the HPF 301.

The HPF 301 has a function of changing its characteristic in an arbitrary frequency band. The HPF 301 outputs a signal in a high frequency band by cutting off low-frequency components contained in the amount of the translational motion blur (image blur due to the translation component of the shake). Note that the HPF 301 is not essential in this embodiment, and the output from the motion vector subtraction unit 316 may be directly supplied to the centering unit 303.

When blur which is too large to be corrected is generated due to panning or the like, the centering unit 303 adds a centering amount to the output of the HPF 301 so as to return the correction amount to zero. Note that the centering unit 303 is not essential in this embodiment, and the output from the HPF 301 may be directly supplied to the integrator 304.

The integrator 304 has a function of changing its characteristic in an arbitrary frequency band. The integrator 304 integrates the output from the centering unit 303, and supplies the result to the saturation prevention control unit 305. That is, the integrator 304 integrates the amount of the translational motion blur (image blur due to the translation component of the shake) caused by the parallel shake for one field, thereby calculating a correction amount necessary for correcting the translational motion blur (the image blur due to the translation component of the shake).

The saturation prevention control unit 305 controls to limit the output of the integrator 304 to a value smaller than a limiter value. Furthermore, when the output of the integrator 304 becomes close to the limiter value, the saturation prevention control unit 305 performs a control operation, for example, changes the cutoff frequency of the HPF 301 toward the high frequency side, shortens the time constant of the integrator 304, or increases the centering amount of the centering unit 303. The output of the saturation prevention control unit 305 indicates the correction amount of the translational motion blur (the image blur due to the translation component of the shake) caused by the parallel shake, and is supplied to an image deformation amount combining unit 230.

Blocks 311 to 315 used to calculate an image deformation component caused by a rotational shake will now be described. Among outputs from the A/D converter 103, angular velocity data in the yaw, pitch, or roll direction is supplied to the HPF 311. The HPF 311 has a function of changing its characteristic in an arbitrary frequency band. The HPF 311 outputs a signal in a high frequency band by cutting off low-frequency components contained in the angular velocity data. Note that the HPF 311 is not essential in this embodiment, and the output from the A/D converter 103 may be directly supplied to the centering unit 312.

When panning or a rotational shake which is too large to be corrected is generated in the yaw, pitch, or roll direction of the image capture apparatus 100, the centering unit 312 adds an input value (to be referred to as a centering amount hereinafter) to the output of the HPF 311 so as to return the correction amount to zero. Note that the centering unit 312 is not essential in this embodiment, and the output from the HPF 311 may be directly supplied to the integrator 313.

The integrator 313 has a function of changing its characteristic in an arbitrary frequency band. The integrator 313 integrates the output from the centering unit 312, and supplies the result to the saturation prevention control unit 314 as angle data. The saturation prevention control unit 314 controls to limit the output of the integrator 313 to a value smaller than a limiter value. Furthermore, when the output of the integrator 313 becomes close to the limiter value, the saturation prevention control unit 314 performs a control operation, for example, changes the cutoff frequency of the HPF 311 toward the high frequency side, shortens the time constant of the integrator 313, or increases the centering amount of the centering unit 312. The output of the saturation prevention control unit 314 is angle data to undergo image stabilization, and is supplied to the image deformation amount calculation unit 315.

The output of a focal length calculation unit 231 and the output of the saturation prevention control unit 314, that is, the angle data to undergo image stabilization of the rotational shake acting on the image capture apparatus are supplied to the image deformation amount calculation unit 315. Based on the angle data, the image deformation amount calculation unit 315 calculates an image deformation amount caused by the rotational shake. To calculate the image deformation amount based on angle data, it is only necessary to calculate a projective transformation matrix in expression (1) according to equations (11) and (12). The image deformation amount calculation unit 315 outputs the value of each element of the calculated projective transformation matrix to the image deformation amount combining unit 230.

The image deformation amount combining unit 230 adds the translational motion correction amounts calculated based on the parallel shake to the projective transformation matrix calculated based on the rotational shake, and outputs the result. It is seen that according to equation (13), a horizontal translational motion amount $t_x$ and a vertical translational motion amount $t_y$ of the projective transformation matrix in expression (1) calculated by the image deformation amount calculation unit 315 are given by:

$$t_x = h3 \tag{39}$$

$$t_y = h6 \tag{40}$$

It is, therefore, possible to add the translational motion correction amounts calculated based on the parallel shake to the projective transformation matrix according to:

$$H_{stb} = \begin{bmatrix} h1 & h2 & h3 + t_{shx} \\ h4 & h5 & h6 + t_{shy} \\ h7 & h8 & 1 \end{bmatrix} \tag{41}$$

where $H_{stb}$ represents the projective transformation matrix after addition, and $t_{shx}$ and $t_{shy}$ represent the translational motion correction amounts calculated based on the parallel shake.

An image deformation unit 127 performs image stabilization by image deformation based on the output from the image deformation amount combining unit 230.

As described above, according to the eighth embodiment, an image deformation component which is detected using only the output of the angular velocity sensor 102 in the arrangement according to the first embodiment is calculated using the output of the motion vector detection unit 126 in addition to the output of the angular velocity sensor 102. This enables the motion vector detection unit 126 to detect translational motion blur (image blur due to the translation component of a shake) caused by a parallel shake which cannot be detected by the angular velocity sensor 102, and enables the image deformation unit 127 to correct the translation component based on the detection result. At this time, the correction amount of the translational blur (the image blur due to the translation component of the shake) caused by the parallel shake is obtained by subtracting the correction amount of the translational motion blur (the image blur due to the translation component of the shake) calculated by the angular velocity sensor 102 from the amount of the translational blur (the image blur due to the translation component of the shake) detected by the motion vector detection unit 126, and is added to the projective transformation matrix calculated based on the rotational shake to perform correction, thereby achieving image stabilization performance with higher accuracy. Furthermore, by configuring to calculate a perspective component correction amount based on the rotational shake obtained by the angular velocity sensor 102, it is possible to maintain the correspondence between a translational motion correction amount and a perspective component correction amount which have been caused by the rotational shake, thereby achieving preferred image stabilization performance with a simpler arrangement.

Note that although the cutoff frequency of the HFP, the time constant of the integrator, or the centering amount of the centering unit is controlled according to the angle data (the output of the integrator) in calculation of the image deformation amount due to the rotational shake in the block diagram shown in FIG. 16, it is possible to obtain the same effects using a method of performing a control operation according to each deformation component of an image deformation amount.

Figure 17:
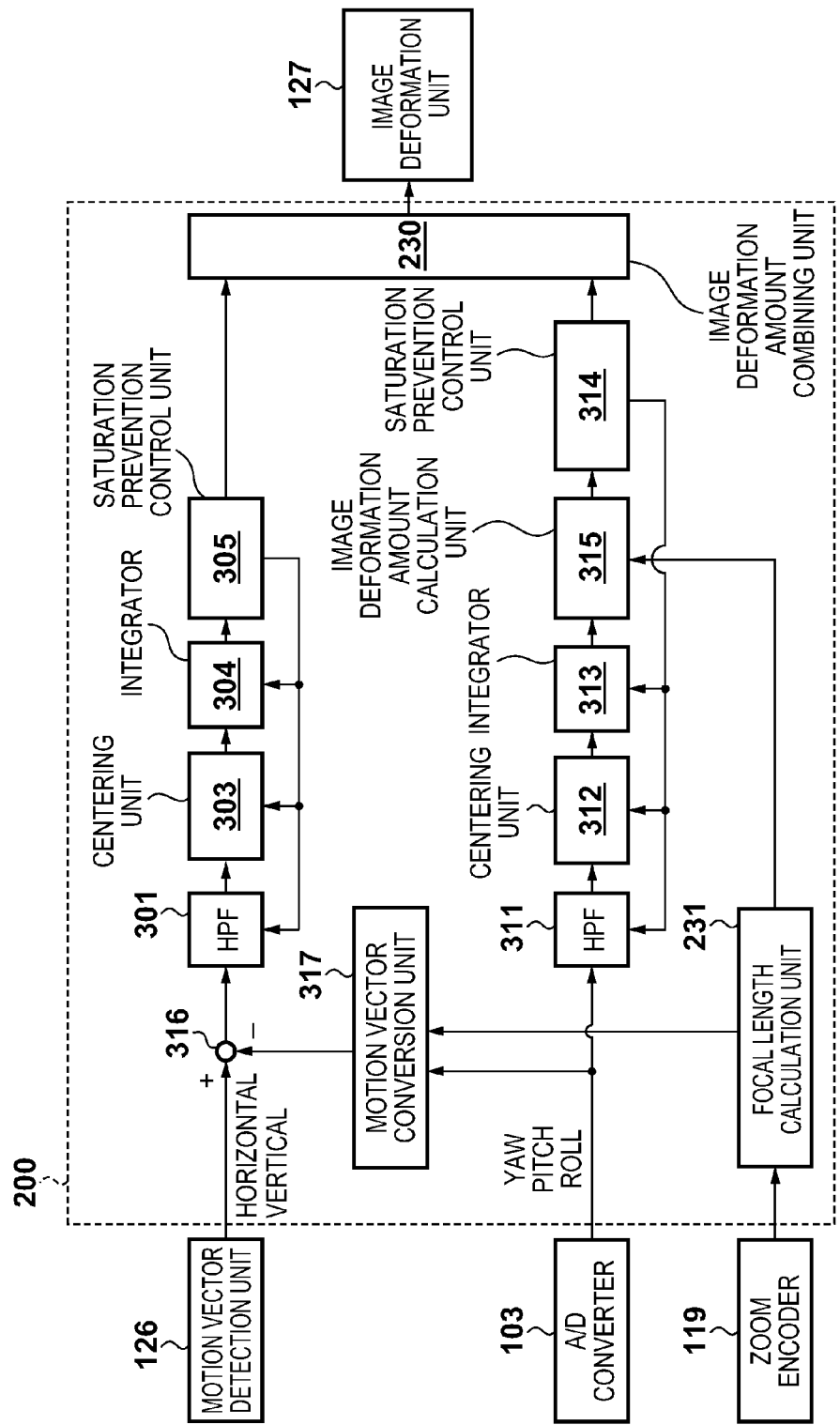
FIG. 17 is a block diagram showing another example of the arrangement of the image deformation amount calculation unit according to the eighth embodiment.

A block diagram shown in FIG. 17 will be described below. In FIG. 17, the same components as those shown in FIG. 16 have the same reference numerals and a description thereof will be omitted. The arrangement of an image deformation amount calculation unit 200 shown in FIG. 17 is different from that shown in FIG. 16 in that the output of an image deformation amount calculation unit 315 is supplied to a saturation prevention control unit 314, and the saturation prevention control unit 314 controls an HPF 311, centering unit 312, and integrator 313 according to an image deformation amount.

The output of a focal length calculation unit 231 and the output of the integrator 313, that is, angle data acting on the image capture apparatus are supplied to the image deformation amount calculation unit 315. The image deformation amount calculation unit 315 calculates an image deformation amount caused by a rotational shake based on the angle data, and outputs the calculated image deformation amount to the saturation prevention control unit 314.

If the horizontal translation component in equation (13) of the image deformation components output from the image deformation amount calculation unit 315 becomes close to a limiter value, the saturation prevention control unit 314 performs a control operation, for example, changes, toward the high frequency side, the cutoff frequency of the HPF 311 which is used for calculation of angle data in the yaw direction, shortens the time constant of the integrator 313, or increases the centering amount of the centering unit 312. Similarly, by associating the pitch direction with the vertical translation component, and associating the roll direction with the rotation angle, it is possible to obtain the same effects as those obtained in the arrangement shown in FIG. 16. Alternatively, it is also possible to obtain the same effects using a horizontal perspective component instead of the horizontal translation component and a vertical perspective component instead of the vertical translation component.

Ninth Embodiment

A second method of processing executed by the image deformation amount calculation unit 200 of the image capture apparatus 100 shown in FIG. 13 according to the seventh embodiment will be described in detail below with reference to the accompanying drawings. As described above, the image capture apparatus 100 shown in FIG. 13 detects a rotational shake and parallel shake acting on the apparatus using both the angular velocity sensor 102 and the motion vector detection unit 126. FIG. 13 shows the arrangement in which the optical correction system 122 for optically correcting blur of a captured image, and blocks for controlling the optical correction system 122 are added to the arrangement shown in FIG. 15.

Figure 18:
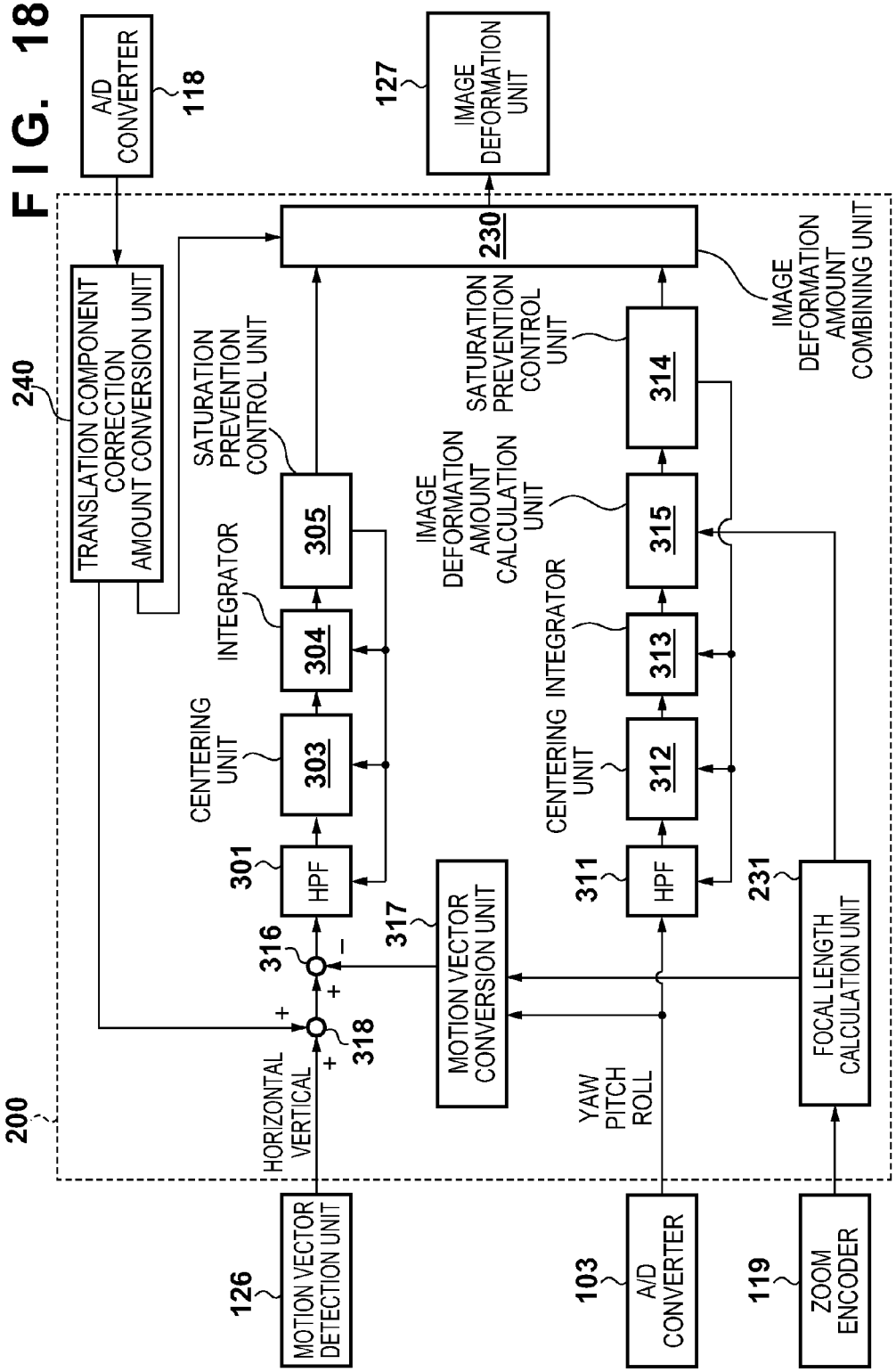
FIG. 18 is a block diagram showing an example of the arrangement of an image deformation amount calculation unit according to a ninth embodiment.

The components of an image deformation amount calculation unit 200 and examples of their operations according to this embodiment will be described in detail below with reference to a block diagram shown in FIG. 18. Note that in FIG. 18, the same components as those shown in FIG. 17 have the same reference numerals and a description thereof will be omitted. FIG. 18 shows the arrangement in which a translational motion correction amount conversion unit 240 and motion vector addition unit 318 are added to the arrangement shown in FIG. 17.

Referring to FIG. 18, blocks 301 to 305, 315, and 316 are used to calculate translational motion correction amounts due to a parallel shake, as described above. In the case of the image capture apparatus that optically corrects blur of a captured image, the amount of translational motion blur (image blur due to the translation component of a shake) detected by a motion vector detection unit 126 is obtained by adding the following components: a residual blur component after an optical correction system 122 corrects translational motion blur (image blur due to the translation component of a shake) of a captured image caused by a rotational shake acting on the image capture apparatus, and components of translational motion blur (image blur due to the translation component of a shake) of the captured image caused by a parallel shake acting on the image capture apparatus. To extract the components of the translational motion blur (the image blur due to the translation component of the shake) of the captured image caused by the parallel shake acting on the image capture apparatus from the output of the motion vector detection unit 126, the following calculation is performed.

The motion vector addition unit 318 adds the output of the motion vector detection unit 126 to the output of the translational motion correction amount conversion unit 240, that is, a translational motion correction amount corrected by the optical correction system 122 on an imaging plane, and outputs the result. This makes it possible to obtain the components of translational motion blur (image blur due to the translation component of the shake) of the captured image caused by the shake acting on the image capture apparatus (the components of translational blur (image blur due to the translation component of the shake) corresponding to a captured image which has not been corrected by the optical correction system 122). Note that the shake includes both rotational shake and parallel shake.

The motion vector subtraction unit 316 subtracts, from the output of the motion vector addition unit 318, the output of a motion vector conversion unit 317, that is, an amount corresponding to translational motion blur (image blur due to the translation component of the shake) caused by the rotational shake for one field, and outputs the result. In this way, only translational motion blur (image blur due to the translation component of the shake) caused by the parallel shake is extracted from the output of the motion vector detection unit 126, and is then supplied to the HPF 301. The blocks 301 to 305 are the same as those shown in FIG. 17 and a description thereof will be omitted. Furthermore, the blocks 311 to 315 used to calculate image deformation components caused by the rotational shake are also the same as those shown in FIG. 17 and a description thereof will be omitted.

The output of the image deformation amount calculation unit 315 and the output of the translational motion correction amount conversion unit 240 are supplied to an image deformation amount combining unit 230, which adds the translational motion correction amounts calculated based on the parallel shake to the projective transformation matrix calculated based on the rotational shake and outputs the result. Since the projective transformation matrix output from the image deformation amount calculation unit 315 includes the components of translational motion blur (image blur due to the translation component of the shake) corrected by an angular velocity sensor 102, it is necessary to subtract the output of the translational motion correction amount conversion unit 240 which includes the components of translational motion blur (image blur due to the translation component of the shake). According to equations (39) and (40), as described above, the components of translational motion blur need only be added to/subtracted from h3 and h6 of the elements of the projective transformation matrix in expression (1). That is, a projective transformation matrix $H_{stb}$ which is a final image deformation amount is calculated by $$H_{stb} = \begin{bmatrix} h1 & h2 & h3 + t_{shx} - t_{oisx} \\ h4 & h5 & h6 + t_{shy} - t_{oisy} \\ h7 & h8 & 1 \end{bmatrix} \quad (42)$$

where $t_{shx}$ and $t_{shy}$ represent the translational motion correction amounts calculated based on the parallel shake and $t_{oisx}$ and $t_{oisy}$ represent the components of translational motion blur (image blur due to the translational component of the shake) corrected by the angular velocity sensor 102.

An image deformation unit 127 performs image stabilization by image deformation based on the output from the image deformation amount combining unit 230.

As described above, according to the ninth embodiment of the present invention, the optical correction system 122 optically corrects translational motion blur (image blur due to the translation component of the shake) in addition to the arrangement according to the eighth embodiment. This can limit the number of extra pixels necessary for deformation in the translational motion direction to a smaller number, and maintain the number of pixels which can be output from the image deformation unit 127 as many as possible, thereby minimizing degradation in image quality.

By calculating a correction amount using the output of the motion vector detection unit 126 in addition to the output of the angular velocity sensor 102, it is possible to detect translational motion blur caused by a parallel shake (image blur due to the translation component of the shake), and cause the image deformation unit 127 to correct the translation component based on the detection result, thereby achieving image stabilization performance with higher accuracy.

Moreover, by configuring to calculate a perspective component correction amount based on the rotational shake obtained by the angular velocity sensor 102, it is possible to maintain the correspondence between a translational motion correction amount and the perspective component correction amount which have been caused by the rotational shake, thereby achieving preferred image stabilization performance with a simpler arrangement.

Note that in the ninth embodiment, the optical correction system 122 has been exemplified as optical image stabilization means. The present invention, however, is not limited to this. For example, various kinds of image stabilization means such as a method of driving an image sensor 123 and a method using a prism can be used.

The present invention has been described in detail based on the preferred embodiments. However, the present invention is not limited to those specific embodiments, and also incorporates various other embodiments without departing from the scope of the present invention. Some of the above-described embodiments may be combined as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-233302, filed Oct. 22, 2012, which is hereby incorporated by reference herein in its entirety.

What is claimed is:

1. An image capture apparatus comprising:
a shake detection unit configured to detect a shake of said image capture apparatus;
a translational motion correction amount calculation unit configured to calculate, based on an output of said shake detection unit, a first correction amount for correcting a translational motion component of image blurring generated in a captured image due to the shake;
a perspective component correction amount calculation unit configured to calculate, based on the output of said shake detection unit, a second correction amount for correcting a perspective component of the image blurring generated in the captured image due to the shake;
an image stabilization unit configured to correct the image blurring of the captured image based on the first correction amount and the second correction amount; and
a control unit configured to control, if a panning state of said image capture apparatus is determined, said translational motion correction amount calculation unit and said perspective component correction amount calculation unit so as to decrease correction amount for the translational motion component and the perspective component.

2. The apparatus according to claim 1,
wherein said perspective component correction amount calculation unit calculates the second correction amount using the first correction amount.

3. The apparatus according to claim 1,
wherein said image stabilization unit includes
an optical correction unit configured to optically correct the image blurring generated in the captured image due to the shake, and
an electronic correction unit configured to electronically correct the image blurring generated in the captured image due to the shake, and
said image capture apparatus further comprises a division unit configured to divide the first correction amount into a third correction amount to be corrected by said optical correction unit and a fourth correction amount to be corrected by said electronic correction unit at a predetermined ratio.

4. The apparatus according to claim 1,
wherein each of said translational motion correction amount calculation unit and said perspective component correction amount calculation unit includes a high-pass filter, and
said control unit changes cutoff frequencies of said high-pass filters so as to limit the first correction amount and the second correction amount.

5. The apparatus according to claim 1,
wherein each of said translational motion correction amount calculation unit and said perspective component correction amount calculation unit includes an integration unit, and
said control unit changes time constants of said integration units so as to limit the first correction amount and the second correction amount.

6. The apparatus according to claim 1,
wherein said control unit performs a control operation so that a characteristic of said translational motion correction amount calculation unit is substantially the same as a characteristic of said perspective component correction amount calculation unit.

7. The apparatus according to claim 1, wherein said control unit controls, if a panning state of said image capture apparatus is determined, said translational motion correction amount calculation unit and said perspective component correction amount calculation unit so as to decrease correction amount for the translational motion component and the perspective component while keeping correlation between the translational motion component and the perspective component.

8. The apparatus according to claim 1, further comprising:
a rotation component correction amount calculation unit configured to calculate, based on the output of the shake detection unit, a third correction amount for correcting a rotation component of image blurring generated in a captured image due to the shake,
wherein said control unit controls, if a panning state is determined, said translational motion correction amount calculation unit, said perspective component correction amount calculation unit and said rotation component correction amount calculation unit so as to decrease correction amount for the translational motion component, the perspective component and the rotation component while keeping correlation between the translational motion component, the perspective component and the rotation component.

9. An image capture apparatus comprising:
a shake detection unit configured to detect a shake of said image capture apparatus;
a translational motion correction amount calculation unit configured to calculate, based on an output of said shake detection unit, a first correction amount for correcting a translational motion component of image blurring generated in a captured image due to the shake;
a perspective component correction amount calculation unit configured to calculate, based on the output of said shake detection unit, a second correction amount for correcting a perspective component of the image blurring generated in the captured image due to the shake;
an image stabilization unit configured to correct the image blurring of the captured image based on the first correction amount and the second correction amount; and
a control unit configured to change correction amount for the translational motion component and the perspective component, based on at least one of the first correction amount and the second correction amount.

10. An image capture apparatus comprising:
a shake detection unit configured to detect a shake of said image capture apparatus;
a perspective component correction amount calculation unit configured to calculate, based on an output of said shake detection unit, a first correction amount for correcting a perspective component of the image blurring;
a translational motion correction amount calculation unit configured to calculate, based on the first correction amount, a second correction amount for correcting a translational motion component of image blurring generated in a captured image due to the shake; and
a correction unit configured to correct the image blurring based on the first correction amount and the second correction amount.

11. An image processing apparatus comprising:
a translational motion correction amount calculation unit configured to calculate, based on an output of a shake detection unit, a first correction amount for correcting a translational motion component;
a perspective component correction amount calculation unit configured to calculate, based on the output of the shake detection unit, a second correction amount for correcting a perspective component;
an image stabilization control unit configured to control an image stabilization unit to correct image blurring of a captured image based on the first correction amount and the second correction amount; and
an image stabilization amount control unit configured to control, if a panning state is determined, said translational motion correction amount calculation unit and said perspective component correction amount calculation unit so as to decrease correction amount for the translational motion component and the perspective component.

12. The apparatus according to claim 11,
wherein said perspective component correction amount calculation unit calculates the second correction amount using the first correction amount.

13. The apparatus according to claim 11, further comprising:
a rotation component correction amount calculation unit configured to calculate, based on the output of the shake detection unit, a third correction amount for correcting a rotation component,
wherein said image stabilization amount control unit controls, if a panning state is determined, said translational motion correction amount calculation unit, said perspective component correction amount calculation unit and said rotation component correction amount calculation unit so as to decrease correction amount for the translational motion component, the perspective component and the rotation component.

14. The apparatus according to claim 11,
wherein each of said translational motion correction amount calculation unit and said perspective component correction amount calculation unit includes a high-pass filter, and
said image stabilization amount control unit sets cutoff frequencies of the high-pass filters to be larger if a panning state is determined.

15. The apparatus according to claim 11,
wherein each of said translational motion correction amount calculation unit and said perspective component correction amount calculation unit includes an integration unit, and
said image stabilization amount control unit sets time constants of the integration units to be shorter if a panning state is determined.

16. The apparatus according to claim 11,
wherein said image stabilization amount control unit performs a control operation so that a characteristic of said translational motion correction amount calculation unit is substantially the same as a characteristic of said perspective component correction amount calculation unit.

17. An image capture apparatus comprising:
an image capture unit configured to capture one or more images; and
said image processing apparatus defined in claim 11.

18. The apparatus according to claim 11, wherein said image stabilization amount control unit controls, if a panning state of said image capture apparatus is determined, said translational motion correction amount calculation unit and said perspective component correction amount calculation unit so as to decrease correction amount for the translational motion component and the perspective component while keeping correlation between the translational motion component and the perspective component.

19. The apparatus according to claim 11, further comprising:
a rotation component correction amount calculation unit configured to calculate, based on the output of the shake detection unit, a third correction amount for correcting a rotation component of image blurring generated in a captured image due to the shake,
wherein said image stabilization control unit controls, if a panning state is determined, said translational motion correction amount calculation unit, said perspective component correction amount calculation unit and said rotation component correction amount calculation unit so as to decrease correction amount for the translational motion component, the perspective component and the rotation component while keeping correlation between the translational motion component, the perspective component and the rotation component.

20. A method of controlling an image processing apparatus comprising:
- a translational motion correction amount calculation step of calculating, based on an output of a shake detection unit, a first correction amount for correcting a translational motion component;
- a perspective component correction amount calculation step of calculating, based on the output of the shake detection unit, a second correction amount for correcting a perspective component;
- an image stabilization control step of controlling an image stabilization unit to correct image blurring of a captured image based on the first correction amount and the second correction amount; and
- an image stabilization amount control step of controlling, if a panning state is determined, said translational motion correction amount calculation step and said perspective component correction amount calculation step so as to decrease correction amount for the translational motion component and the perspective component.

21. An image processing apparatus comprising:
- a translational motion correction amount calculation unit configured to calculate, based on an output of a shake detection unit, a first correction amount for correcting a translational motion component to reduce image blurring due to a shake;
- a perspective component correction amount calculation unit configured to calculate, based on the output of the shake detection unit, a second correction amount for correcting a perspective component to reduce image blurring due to the shake; and
- a control unit configured to change correction capability for the translational motion component and the perspective component, based on at least one of the first correction amount and the second correction amount.

22. An image processing apparatus comprising:
- a perspective component correction amount calculation unit configured to calculate, based on an output of a shake detection unit, a first correction amount for correcting a perspective component to reduce image blurring due to a shake;
- a translational motion correction amount calculation unit configured to calculate, based on the first correction amount, a second correction amount for correcting a translational motion component of image blurring generated in a captured image due to the shake to reduce the image blurring due to the shake.

23. A method of controlling an image processing apparatus comprising:
- a translational motion correction amount calculation step of calculating, based on an output of a shake detection unit, a first correction amount for correcting a translational motion component to reduce image blurring due to a shake;
- a perspective component correction amount calculation step of calculating, based on the output of the shake detection unit, a second correction amount for correcting a perspective component to reduce image blurring due to the shake; and
- a control step of changing correction capability for the translational motion component and the perspective component, based on at least one of the first correction amount and the second correction amount.

24. A method of controlling an image processing apparatus comprising:
- a perspective component correction amount calculation step of calculating, based on an output of a shake detection unit, a first correction amount for correcting a perspective component to reduce image blurring due to a shake;
- a translational motion correction amount calculation step of calculating, based on the first correction amount, a second correction amount for correcting a translational motion component to reduce image blurring due to the shake.

* * * * *